United States Patent
Janssen et al.

(10) Patent No.: US 7,998,322 B2
(45) Date of Patent: *Aug. 16, 2011

(54) ULTRASONIC TREATMENT CHAMBER HAVING ELECTRODE PROPERTIES

(75) Inventors: Robert Allen Janssen, Alpharetta, GA (US); John Glen Ahles, Neenah, WI (US); Thomas David Ehlert, Neenah, WI (US); John Gavin MacDonald, Decatur, GA (US); Earl C. McCraw, Jr., Duluth, GA (US); Patrick Sean McNichols, Hortonville, WI (US); Paul Warren Rasmussen, Neenah, WI (US); Steve Roffers, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 842 days.

This patent is subject to a terminal disclaimer.

(21) Appl. No.: 11/777,140

(22) Filed: Jul. 12, 2007

(65) Prior Publication Data

US 2009/0014377 A1    Jan. 15, 2009

(51) Int. Cl.
    *C25D 17/00* (2006.01)
(52) U.S. Cl. ...................................... 204/222
(58) Field of Classification Search ............ 204/222; 210/748.02, 748.04; 366/127
    See application file for complete search history.

(56) References Cited

U.S. PATENT DOCUMENTS

| | | | |
|---|---|---|---|
| 2,115,056 A | 4/1938 | Samuel | |
| 2,307,206 A | 1/1943 | Fischer | |
| 2,584,053 A | 1/1952 | Seavey et al. | |
| 2,620,894 A | 12/1952 | Peterson et al. | |
| 2,661,192 A | 12/1953 | Horsley et al. | |
| 2,946,981 A | 7/1960 | O'Neill | |
| 3,066,232 A | 11/1962 | Branson | |
| 3,160,138 A | 12/1964 | Platzman | |
| 3,202,281 A | 8/1965 | Weston | |
| 3,239,998 A | 3/1966 | Carter et al. | |
| 3,246,881 A | 4/1966 | Davidson et al. | |

(Continued)

FOREIGN PATENT DOCUMENTS

CA        2175065        5/1995

(Continued)

OTHER PUBLICATIONS

Non-final Office action regarding U.S. Appl. No. 11/965,435, dated Mar. 11, 2010.

(Continued)

*Primary Examiner* — Luan V Van
(74) *Attorney, Agent, or Firm* — Armstrong Teasdale LLP

(57) ABSTRACT

A liquid treatment chamber having an elongate housing through which liquid flows longitudinally from an inlet port to an outlet port thereof is disclosed. An elongate ultrasonic waveguide assembly extends within the housing and is operable at a predetermined ultrasonic frequency and a predetermined electrode potential to ultrasonically energize and electrolyze liquid within the housing. An elongate ultrasonic horn of the waveguide assembly is disposed at least in part intermediate the inlet and outlet ports, and has a plurality of discrete agitating members in contact with and extending transversely outward from the horn intermediate the inlet and outlet ports in longitudinally spaced relationship with each other. The horn and agitating members are constructed and arranged for dynamic motion of the agitating members relative to the horn at the predetermined frequency and to operate in an ultrasonic cavitation mode of the agitating members corresponding to the predetermined frequency and the liquid being treated in the chamber.

17 Claims, 9 Drawing Sheets

U.S. PATENT DOCUMENTS

| | | | |
|---|---|---|---|
| 3,249,453 A | 5/1966 | Schnoring et al. |
| 3,273,631 A | 9/1966 | Neuman |
| 3,275,787 A | 9/1966 | Newberry |
| 3,278,165 A | 10/1966 | Gaffney |
| 3,284,991 A | 11/1966 | Ploeger et al. |
| 3,325,348 A | 6/1967 | Bennett |
| 3,326,470 A | 6/1967 | Loudin et al. |
| 3,338,992 A | 8/1967 | Kinney |
| 3,341,394 A | 9/1967 | Kinney |
| 3,425,951 A | 2/1969 | Ishiwata |
| 3,463,321 A | 8/1969 | VanIngen |
| 3,479,873 A | 11/1969 | Hermanns |
| 3,490,584 A | 1/1970 | Balamuth |
| 3,502,763 A | 3/1970 | Hartman |
| 3,519,251 A | 7/1970 | Hammitt et al. |
| 3,542,345 A | 11/1970 | Kuris |
| 3,542,615 A | 11/1970 | Dobo et al. |
| 3,567,185 A | 3/1971 | Ross et al. |
| 3,591,946 A | 7/1971 | Loe |
| 3,664,191 A | 5/1972 | Hermanns |
| 3,692,618 A | 9/1972 | Dorschner et al. |
| 3,782,547 A | 1/1974 | Dietert |
| 3,802,817 A | 4/1974 | Matsuki et al. |
| 3,865,350 A | 2/1975 | Burtis |
| 3,873,071 A | 3/1975 | Tatebe |
| 3,904,392 A | 9/1975 | VanIngen et al. |
| 4,035,151 A | 7/1977 | Czerny et al. |
| 4,062,768 A | 12/1977 | Elliot |
| 4,070,167 A | 1/1978 | Barbee et al. |
| 4,122,797 A | 10/1978 | Kawamura et al. |
| 4,168,295 A | 9/1979 | Sawyer |
| 4,218,221 A | 8/1980 | Cottell |
| 4,249,986 A | 2/1981 | Obeda |
| 4,259,021 A | 3/1981 | Goudy, Jr. |
| 4,260,389 A | 4/1981 | Lister |
| 4,266,879 A | 5/1981 | McFall |
| 4,340,563 A | 7/1982 | Appel et al. |
| 4,372,296 A | 2/1983 | Fahim |
| 4,398,925 A | 8/1983 | Trinh et al. |
| 4,425,718 A | 1/1984 | Kawaguchi |
| 4,511,254 A | 4/1985 | North et al. |
| 4,556,467 A * | 12/1985 | Kuhn et al. .................. 204/193 |
| 4,612,016 A | 9/1986 | Jaeger et al. |
| 4,612,018 A | 9/1986 | Tsuboi et al. |
| 4,663,220 A | 5/1987 | Wisneski et al. |
| 4,673,512 A | 6/1987 | Schram |
| 4,693,879 A | 9/1987 | Yoshimura et al. |
| 4,699,636 A | 10/1987 | Bofinger et al. |
| 4,706,509 A | 11/1987 | Riebel |
| 4,708,878 A | 11/1987 | Hagelauer et al. |
| 4,726,522 A | 2/1988 | Kokubo et al. |
| 4,743,361 A | 5/1988 | Schram |
| 4,848,159 A | 7/1989 | Kennedy et al. |
| 4,877,516 A | 10/1989 | Schram |
| 4,879,011 A | 11/1989 | Schram |
| 4,929,279 A | 5/1990 | Hays |
| RE33,524 E | 1/1991 | Schram |
| 4,983,045 A | 1/1991 | Taniguchi |
| 5,006,266 A | 4/1991 | Schram |
| 5,026,167 A | 6/1991 | Berliner, III |
| 5,032,027 A | 7/1991 | Berliner, III |
| 5,059,249 A | 10/1991 | Hays |
| 5,096,532 A | 3/1992 | Neuwirth et al. |
| 5,110,403 A | 5/1992 | Ehlert |
| 5,122,165 A | 6/1992 | Wang et al. |
| 5,164,094 A | 11/1992 | Stuckart |
| 5,169,067 A | 12/1992 | Matsusaka et al. |
| 5,242,557 A | 9/1993 | Jones et al. |
| 5,258,413 A | 11/1993 | Isayev |
| 5,269,297 A | 12/1993 | Weng et al. |
| 5,326,164 A | 7/1994 | Logan |
| 5,330,100 A | 7/1994 | Malinowski |
| 5,335,449 A | 8/1994 | Beatty |
| 5,372,634 A | 12/1994 | Monahan |
| 5,373,212 A | 12/1994 | Beau |
| 5,375,926 A | 12/1994 | Omasa |
| 5,391,000 A | 2/1995 | Taniguchi |
| 5,466,722 A | 11/1995 | Stoffer et al. |
| 5,519,670 A | 5/1996 | Walter |
| 5,536,921 A | 7/1996 | Hedrick et al. |
| 5,583,292 A | 12/1996 | Karbach et al. |
| 5,585,565 A | 12/1996 | Glascock et al. |
| 5,665,383 A | 9/1997 | Grinstaff et al. |
| 5,681,457 A | 10/1997 | Mahoney |
| 5,711,888 A | 1/1998 | Trampler et al. |
| 5,770,124 A | 6/1998 | Marecki et al. |
| 5,803,270 A | 9/1998 | Brodeur |
| 5,810,037 A | 9/1998 | Sasaki et al. |
| 5,831,166 A | 11/1998 | Kozuka et al. |
| 5,853,456 A | 12/1998 | Bryan et al. |
| 5,868,153 A | 2/1999 | Cohen et al. |
| 5,873,968 A | 2/1999 | Pike et al. |
| 5,902,489 A | 5/1999 | Yasuda et al. |
| 5,916,203 A | 6/1999 | Brandon et al. |
| 5,922,355 A | 7/1999 | Parikh et al. |
| 5,935,883 A | 8/1999 | Pike |
| 5,937,906 A | 8/1999 | Kozyuk |
| 5,964,926 A | 10/1999 | Cohen |
| 5,979,664 A | 11/1999 | Brodeur |
| 6,010,592 A | 1/2000 | Jameson et al. |
| 6,020,277 A | 2/2000 | Jameson |
| 6,035,897 A | 3/2000 | Kozyuk |
| 6,053,028 A | 4/2000 | Kraus, Jr. et al. |
| 6,053,424 A | 4/2000 | Gipson et al. |
| 6,055,859 A | 5/2000 | Kozuka et al. |
| 6,060,416 A | 5/2000 | Kobata |
| 6,074,466 A | 6/2000 | Iwasa |
| 6,090,731 A | 7/2000 | Pike et al. |
| 6,106,590 A | 8/2000 | Ueno et al. |
| 6,169,045 B1 | 1/2001 | Pike et al. |
| 6,200,486 B1 | 3/2001 | Chahine et al. |
| 6,218,483 B1 | 4/2001 | Muthiah et al. |
| 6,221,258 B1 | 4/2001 | Feke et al. |
| 6,254,787 B1 | 7/2001 | Kimura et al. |
| 6,266,836 B1 | 7/2001 | Gallego Juarez et al. |
| 6,315,215 B1 | 11/2001 | Gipson et al. |
| 6,322,240 B1 | 11/2001 | Omasa |
| 6,332,541 B1 | 12/2001 | Coakley et al. |
| 6,361,697 B1 | 3/2002 | Coury et al. |
| 6,368,414 B1 | 4/2002 | Johnson |
| 6,380,264 B1 | 4/2002 | Jameson et al. |
| 6,383,301 B1 | 5/2002 | Bell et al. |
| 6,450,417 B1 | 9/2002 | Gipson et al. |
| 6,467,350 B1 | 10/2002 | Kaduchak et al. |
| 6,482,327 B1 | 11/2002 | Mori et al. |
| 6,506,584 B1 | 1/2003 | Chandler et al. |
| 6,547,903 B1 | 4/2003 | McNichols et al. |
| 6,547,935 B2 | 4/2003 | Scott |
| 6,547,951 B1 * | 4/2003 | Maekawa ...................... 205/688 |
| 6,551,607 B1 | 4/2003 | Minerath, III |
| 6,576,042 B2 | 6/2003 | Kraus et al. |
| 6,582,611 B1 | 6/2003 | Kerfoot |
| 6,593,436 B2 | 7/2003 | Austin et al. |
| 6,605,252 B2 | 8/2003 | Omasa |
| 6,620,226 B2 | 9/2003 | Hutton et al. |
| 6,624,100 B1 | 9/2003 | Pike et al. |
| 6,627,265 B2 | 9/2003 | Kutilek |
| 6,655,826 B1 | 12/2003 | Leanos |
| 6,659,365 B2 | 12/2003 | Gipson et al. |
| 6,676,003 B2 | 1/2004 | Ehlert et al. |
| 6,689,730 B2 | 2/2004 | Hortel et al. |
| 6,739,524 B2 | 5/2004 | Taylor-McCune et al. |
| 6,770,600 B1 | 8/2004 | Lamola |
| 6,817,541 B2 | 11/2004 | Sands et al. |
| 6,818,128 B2 | 11/2004 | Minter |
| 6,837,445 B1 | 1/2005 | Tsai |
| 6,841,921 B2 | 1/2005 | Stegelmann |
| 6,858,181 B2 | 2/2005 | Aoyagi |
| 6,878,288 B2 | 4/2005 | Scott |
| 6,883,724 B2 | 4/2005 | Adiga et al. |
| 6,890,593 B2 | 5/2005 | Tian |
| 6,897,628 B2 | 5/2005 | Gunnerman |
| 6,902,650 B2 | 6/2005 | Park et al. |
| 6,911,153 B2 | 6/2005 | Minter |
| 6,929,750 B2 | 8/2005 | Laurell et al. |
| 6,935,770 B2 | 8/2005 | Schueler |
| 6,936,151 B1 | 8/2005 | Lock |

| | | |
|---|---|---|
| 7,018,546 B2 | 3/2006 | Kurihara et al. |
| 7,083,322 B2 | 8/2006 | Moore et al. |
| 7,083,764 B2 | 8/2006 | Scott |
| 7,090,391 B2 | 8/2006 | Taniguchi |
| 7,108,137 B2 | 9/2006 | Lal et al. |
| 7,150,779 B2 | 12/2006 | Meegan, Jr. |
| 7,156,201 B2 | 1/2007 | Peshkovskiy et al. |
| 7,293,909 B2 | 11/2007 | Taniguchi |
| 7,322,431 B2 | 1/2008 | Ratcliff |
| 7,338,551 B2 | 3/2008 | Kozyuk |
| 7,404,666 B2 | 7/2008 | Tessien |
| 7,414,009 B2 | 8/2008 | Tanaka et al. |
| 7,419,519 B2 | 9/2008 | Li et al. |
| 7,424,883 B2 | 9/2008 | McNichols et al. |
| 7,465,426 B2 | 12/2008 | Kerherve et al. |
| 7,504,075 B2 | 3/2009 | Marhasin |
| 7,516,664 B2 | 4/2009 | Meier et al. |
| 7,533,830 B1 | 5/2009 | Rose |
| 7,582,156 B2 | 9/2009 | Tanaka et al. |
| 7,673,516 B2 * | 3/2010 | Janssen et al. ............... 73/592 |
| 7,703,698 B2 * | 4/2010 | Janssen et al. ............. 239/102.2 |
| 7,712,353 B2 * | 5/2010 | Janssen et al. ............... 73/61.73 |
| 7,735,751 B2 | 6/2010 | Ehlert et al. |
| 7,785,674 B2 | 8/2010 | Janssen et al. |
| 2001/0040935 A1 | 11/2001 | Case |
| 2002/0036173 A1 | 3/2002 | Feke et al. |
| 2002/0164274 A1 | 11/2002 | Haggett et al. |
| 2003/0042174 A1 | 3/2003 | Austin |
| 2003/0047067 A1 | 3/2003 | Kraus et al. |
| 2003/0048692 A1 | 3/2003 | Cohen et al. |
| 2003/0051989 A1 | 3/2003 | Austin |
| 2003/0061939 A1 | 4/2003 | Hutton et al. |
| 2003/0066899 A1 | 4/2003 | Gipson |
| 2003/0116014 A1 | 6/2003 | Possanza et al. |
| 2003/0143110 A1 | 7/2003 | Kritzler |
| 2003/0194692 A1 | 10/2003 | Purdum |
| 2003/0234173 A1 | 12/2003 | Minter |
| 2004/0022695 A1 | 2/2004 | Simon et al. |
| 2004/0065599 A1 | 4/2004 | Lal et al. |
| 2004/0079580 A1 | 4/2004 | Manna et al. |
| 2004/0120904 A1 | 6/2004 | Lye et al. |
| 2004/0142041 A1 | 7/2004 | MacDonald et al. |
| 2004/0187524 A1 | 9/2004 | Sen et al. |
| 2004/0202728 A1 | 10/2004 | Shanker et al. |
| 2005/0000914 A1 | 1/2005 | Dahlberg et al. |
| 2005/0008560 A1 | 1/2005 | Kataoka et al. |
| 2005/0017599 A1 | 1/2005 | Puskas |
| 2005/0025797 A1 | 2/2005 | Wang |
| 2005/0082234 A1 | 4/2005 | Solenthaler |
| 2005/0084438 A1 | 4/2005 | Do et al. |
| 2005/0084464 A1 | 4/2005 | McGrath et al. |
| 2005/0085144 A1 | 4/2005 | MacDonald et al. |
| 2005/0092931 A1 | 5/2005 | Gadgil et al. |
| 2005/0129161 A1 | 6/2005 | Laberge |
| 2005/0235740 A1 | 10/2005 | Desie et al. |
| 2005/0260106 A1 | 11/2005 | Marhasin |
| 2006/0000034 A1 | 1/2006 | McGrath |
| 2006/0008442 A1 | 1/2006 | MacDonald et al. |
| 2006/0120212 A1 | 6/2006 | Taniguchi et al. |
| 2006/0207431 A1 | 9/2006 | Beca et al. |
| 2007/0114306 A1 | 5/2007 | Kawakami et al. |
| 2007/0119785 A1 | 5/2007 | Englehardt et al. |
| 2007/0131034 A1 | 6/2007 | Ehlert et al. |
| 2007/0170277 A1 | 7/2007 | Ehlert |
| 2008/0061000 A1 * | 3/2008 | Janssen et al. ............... 210/663 |
| 2008/0062811 A1 | 3/2008 | Janssen et al. |
| 2008/0063718 A1 | 3/2008 | Janssen et al. |
| 2008/0067418 A1 | 3/2008 | Ross |
| 2008/0069887 A1 | 3/2008 | Baran et al. |
| 2008/0117711 A1 | 5/2008 | Omasa |
| 2008/0155763 A1 | 7/2008 | Janssen et al. |
| 2008/0156737 A1 | 7/2008 | Janssen et al. |
| 2008/0159063 A1 | 7/2008 | Janssen et al. |
| 2008/0192568 A1 | 8/2008 | Hielscher et al. |
| 2008/0251375 A1 | 10/2008 | Hielscher et al. |
| 2009/0014377 A1 | 1/2009 | Janssen et al. |
| 2009/0147905 A1 | 6/2009 | Janssen et al. |
| 2009/0155091 A1 | 6/2009 | Ehlert et al. |
| 2009/0158936 A1 | 6/2009 | Janssen et al. |
| 2009/0162258 A1 | 6/2009 | Janssen et al. |
| 2009/0165654 A1 | 7/2009 | Koenig et al. |
| 2009/0166177 A1 | 7/2009 | Wenzel et al. |
| 2009/0168590 A1 | 7/2009 | Koenig et al. |
| 2009/0168591 A1 | 7/2009 | Wenzel et al. |
| 2009/0262597 A1 | 10/2009 | Kieffer et al. |
| 2010/0150859 A1 | 6/2010 | Do et al. |
| 2010/0206742 A1 | 8/2010 | Janssen et al. |
| 2010/0296975 A1 | 11/2010 | Peshkovsky et al. |

FOREIGN PATENT DOCUMENTS

| | | |
|---|---|---|
| CH | 657067 | 8/1986 |
| CN | 1247628 | 3/2006 |
| CN | 101153138 | 4/2008 |
| DE | 262553 A3 | 12/1988 |
| DE | 9017338 | 3/1991 |
| DE | 4444525 | 6/1996 |
| DE | 19854013 | 5/2000 |
| DE | 19913397 A1 | 9/2000 |
| DE | 19938254 | 2/2001 |
| DE | 19938254 A1 | 2/2001 |
| DE | 29825063 | 6/2004 |
| DE | 102004040233 | 3/2006 |
| DE | 102005025118 | 1/2007 |
| DE | 102005034629 | 1/2007 |
| EP | 0269941 A1 | 6/1988 |
| EP | 0292470 | 11/1988 |
| EP | 347891 | 12/1989 |
| EP | 0457187 A2 | 11/1991 |
| EP | 0459967 | 12/1991 |
| EP | 0625482 A | 11/1994 |
| EP | 648531 | 4/1995 |
| EP | 0894612 A2 | 2/1999 |
| EP | 1954388 | 3/2007 |
| EP | 0983968 | 3/2008 |
| EP | 2173669 A2 | 4/2010 |
| EP | 2176173 A2 | 4/2010 |
| FR | 2793811 | 11/2000 |
| GB | 1404575 | 9/1975 |
| JP | 56028221 | 3/1981 |
| JP | 57119853 | 7/1982 |
| JP | 5834051 | 2/1983 |
| JP | 62001413 A | 1/1987 |
| JP | 62039839 U | 3/1987 |
| JP | 6372364 | 4/1988 |
| JP | 63104664 | 5/1988 |
| JP | 1108081 | 4/1989 |
| JP | 2025602 | 1/1990 |
| JP | 02281185 A | 11/1990 |
| JP | 03053195 A | 3/1991 |
| JP | 3086258 | 4/1991 |
| JP | 03-157129 A | 5/1991 |
| JP | 6228824 | 8/1994 |
| JP | 8304388 | 11/1996 |
| JP | 9286943 | 11/1997 |
| JP | 10060331 | 3/1998 |
| JP | 1113361 | 5/1999 |
| JP | 2000158364 | 12/1999 |
| JP | 2001017970 | 1/2001 |
| JP | 2001252588 | 9/2001 |
| JP | 2003103152 A | 4/2003 |
| JP | 2004020176 | 1/2004 |
| JP | 2004256783 | 9/2004 |
| JP | 2005118688 | 5/2005 |
| KR | 20020073778 A | 9/2002 |
| KR | 1020050013858 A | 2/2005 |
| KR | 1020050113356 A | 12/2005 |
| WO | 9400757 | 1/1994 |
| WO | 9420833 | 9/1994 |
| WO | 9429873 A | 12/1994 |
| WO | 9600318 | 1/1996 |
| WO | 9609112 A1 | 3/1996 |
| WO | 9743026 | 11/1997 |
| WO | 9817373 | 4/1998 |
| WO | 9844058 | 10/1998 |
| WO | 99/33520 | 7/1999 |
| WO | 0004978 | 2/2000 |
| WO | 0041794 | 7/2000 |
| WO | 0139200 A | 5/2001 |

| | | |
|---|---|---|
| WO | 0222252 | 3/2002 |
| WO | 0250511 | 6/2002 |
| WO | 02080668 A2 | 10/2002 |
| WO | 03012800 | 2/2003 |
| WO | 03102737 | 12/2003 |
| WO | 2004026452 | 4/2004 |
| WO | 2004064487 | 8/2004 |
| WO | 2005/011804 | 2/2005 |
| WO | 2006037591 | 4/2006 |
| WO | 2006043970 A2 | 4/2006 |
| WO | 2006073645 A1 | 7/2006 |
| WO | 2006074921 | 7/2006 |
| WO | 2006/093804 A | 9/2006 |
| WO | 2007011520 A2 | 1/2007 |
| WO | 2007060245 A1 | 5/2007 |
| WO | 2007095871 | 8/2007 |
| WO | 2008029379 | 3/2008 |
| WO | 2008047259 | 4/2008 |
| WO | 2008085806 | 7/2008 |

OTHER PUBLICATIONS

English translation of Nagel WO 2006/074921 A1, accessed on the EPO website.
Non-final office action regarding U.S. Appl. No. 11/530,311, dated Nov. 5, 2008.
International Search Report and Written Opinion regarding PCT/IB2007/052947, dated Mar. 12, 2008.
Non-final office action regarding U.S. Appl. No. 11/617,497, dated Jun. 26, 2009.
Non-final Office Action regarding U.S. Appl. No. 12/335,231, dated Oct. 15, 2009.
International Search Report and Written Opinion regarding PCT/IB2007/052945, dated Feb. 1, 2008.
Non-final office action regarding U.S. Appl. No. 11/617,515, dated Mar. 27, 2009.
U.S. Appl. No. 11/530,210, filed Sep. 8, 2006.
U.S. Appl. No. 11/530,311, filed Jan. 26, 2007.
International Search Report and Written Opinion regarding PCT/IB2007/052988, 4 pages, dated Feb. 14, 2008.
U.S. Appl. No. 11/777,140, filed Jul. 12, 2007.
Taleyarkhan, et al., "Evidence for Nuclear Emissions During Acoustic Cavitation," Science, (Mar. 8, 2002), vol. 295, pp. 1868-1873.
Kloeppel, James E., "Temperature inside collapsing bubble four times that of sun," News Bureau, University of Illinois at Urbana-Champaign.
Tal-Figiel B., The Formation of Stable W/O, O/W, W/O/W Cosmetic Emulsions in an Ultrasonic Field, viewed at http://www.atypon-link.com/ICHEME/doi/abs/10.1205/cherd06199 on Oct. 19, 2007.
"Controlled Thermonuclear Fusion," viewed at http://library.thinkquest.org/17940/texts/fusion_controlled/ fusion_controlled.html on Oct. 23, 2007.
Flannigan, "Measurement of Pressure and Density Inside a Single Sonoluminescing Bubble," Physical Review Letters (May 26, 2006), PRL 96.
Taleyarkhan, et al., "Additional Evidence of Nuclear Emissions During Acoustic Cavitation," Physcial Review E, (Mar. 2004). vol. 69.
"Thermonuclear Fusion Energy Source for Future Generations," viewed at http://www.crppwww.epfl.ch/crppfusion/ on Oct. 23, 2007.
Peplow, Mark, "Desktop fusion is back on the table," viewed at http://nature.com/news/2006/060109/full/060109-5.html on May 4, 2007.
Lahey, Taleyarkhan, and Nigmatulin, "Bubble Power," IEEE spectrum, May 2005, pp. 39-43.
U.S. Appl. No. 11/963,237, filed Dec. 21, 2007.
U.S. Appl. No. 11/617,497, filed Dec. 28, 2006.
U.S. Appl. No. 11/617,515, filed Dec. 28, 2006.
U.S. Appl. No. 11/777,151, filed Jul. 12, 2007.
U.S. Appl. No. 11/950,943, filed Dec. 5, 2007.
U.S. Appl. No. 11/963,139, filed Dec. 21, 2007.
U.S. Appl. No. 11/966,458, filed Dec. 28, 2007.
U.S. Appl. No. 11/966,472, filed Dec. 28, 2007.
U.S. Appl. No. 11/966,418, filed Dec. 28, 2007.
U.S. Appl. No. 11/966,447, filed Dec. 28, 2007.
U.S. Appl. No. 11/777,145, filed Jul. 12, 2007.
U.S. Appl. No. 11/965,435, filed Dec. 27, 2007.
Non-final Office action regarding U.S. Appl. No. 11/530,183, dated Apr. 19, 2010.
International Search Report and Written Opinion regarding PCT/IB2007/054892 dated May 15, 2008.
International Search Report and Written Opinion regarding PCT/IB2007/054898 dated May 15, 2008.
Final Office Action Regarding U.S. Appl. No. 11/530,311, dated Jun. 23, 2009.
International Search Report and Written Opinion issued Aug. 18, 2009 for PCT/IB2008/055520.
International Search Report and Written Opinion issued Aug. 18, 2009 for PCT/IB2008/055517.
International Search Report and Written Opinion issued Aug. 18, 2009 for PCT/IB2008/055518.
International Search Report and Written Opinion regarding PCT/IB2008/055514, dated Aug. 25, 2009.
International Search Report and Written Opinion regarding PCT/IB2008/052780, dated Feb. 17, 2009.
International Search Report and Written Opinion for PCT/IB2008/052764 mailed Apr. 2, 2009.
International Search Report and Written Opinion regarding PCT/IB2008/055395, dated Sep. 14, 2009.
European Office Action regarding European Application No. 07805228.9, dated Oct. 9, 2009.
International Search Report and Written Opinion regarding PCT/IB2008/055396, dated Jul. 29, 2009.
International Search Report and Written Opinion, PCT/IB2008/055051 (Feb. 20, 2009).
International Search Report and Written Opinion from PCT/IB2008/052766, dated Mar. 31, 2009.
Non-final office action regarding U.S. Appl. No. 11/950,943, dated May 1, 2009.
J.D. Lawson, "Some Criteria for a Power Producing Thermonuclear Reactor", Proc. Phys. Soc. B70, pp. 6-10 (1957).
L.A. Artsimovich, "Controlled Thermonuclear Reactions", Gordon and Breach Science Publishers, New York, first English translation, 1964.
D.R.O. Morrison, "Cold Fusion Update No. 9", Jan. 1994, from Newsgroups sci.physics.fusion, http://www.groups.google.com.
Brenner et al, Single-bubble sonoluminescence, Reviews of Modern Physics, vol. 74, Apr. 2002, pp. 425-484.
J. Lister, Plasma Physics and Controlled Fusion 48, pp. 715-716 (2006).
U.S. Department of Energy, "Report of the Review of Low Energy Nuclear Reactions", Dec. 1, 2004 (USDOE).
International Search Report and Written Opinion regarding PCT/IB2008/055394, dated Sep. 28, 2009.
Blume, T. and Neis, U. "Improved wastewater disinfection by ultrasonic pre-treatment." Ultrasonics Sonochemistry, 2004, No. 11, pp. 333-336.
Takehi Moriguchi, et al. "Metal-modified silica adsorbents for removal of humic substances in water." Journal of Colloid and Interface Science 283, 2005 300-310, See Abstract, pp. 301 and 304.
International Search Report and Written Opinion regarding PCT/IB2009/055090, dated Jul. 16, 2010.
International Search Report and Written Opinion regarding PCT/IB2009/055092, dated Jul. 16, 2010.
Non-final Office action regarding U.S. Appl. No. 11/963,237, dated Jul. 8, 2010.
Non-Final Office action issued in U.S. Appl. No. 11/966,447 on Aug. 2, 2010.
Non-Final Office action issued in U.S. Appl. No. 11/966,418 on Aug. 2, 2010.
Oct. 27, 2010 Letter regarding the Office action issued for Mexican Patent Application Serial No. MX/a/2009/002519 mailed Oct. 12, 2010.
Non-final Office Action submitted in U.S. Appl. No. 12/704,058 dated Dec. 9, 2010.
Non-final Office Action submitted in U.S. Appl. No. 11/530,183 dated Oct. 13, 2010.

Kuo, et al., "Nano-particles dispersion effect on Ni/Al2O3 Composite Coatings," Materials Chemistry and Physics, 86: 5-10 (2004).

Sivakumar, et al., "Preparation of nanosized TiO2 supported on activated alumina by a sonochemical method: observation of an increased photocatalytic decolourisation efficiency," Research on Chemical Intermediates, 30(7-8): 785-792 (2004).

Non-final Office action issued in U.S. Appl. No. 11/530,210 mailed Jun. 28, 2010.

Non-final Office action issued in U.S. Appl. No. 11/530,210 mailed Dec. 1, 2010.

Final Office action issued in U.S. Appl. No. 11/966,447 mailed Jan. 5, 2011.

Supplementary European Search Report issued in EP Application No. 08789242.8 mailed Dec. 17, 2010.

Non-final Office Action issued in U.S. Appl. No. 11/777,151 mailed Dec. 8, 2010.

Final Office Action issued in U.S. Appl. No. 11/966,418 mailed Jan. 12, 2011.

Non-final Office Action received in U.S. Appl. No. 11/966,458 mailed Sep. 28, 2010.

Final Office Action issued in U.S. Appl. No. 11/966,458, dated Mar. 17, 2011.

Final Office Action issued in U.S. Appl. No. 11/530,183, dated Mar. 22, 2011.

Non-Final Office Action issued in U.S. Appl. No. 11/966,472, dated Mar. 31, 2011.

Final Office Action issued in U.S. Appl. No. 12/335,231, dated Mar. 31, 2011.

Barbaglia et al., "Search of Fusion Reactions During the Cavitation of a Single Bubble in Deuterated Liquids," Physica Scripta 72, pp. 75-78 (2005).

Non-final Office action issued in U.S Appl. No. 11/963,139, dated Feb. 18, 2011.

* cited by examiner

ULTRASONIC TREATMENT CHAMBER HAVING ELECTRODE PROPERTIES

FIELD OF DISCLOSURE

The present disclosure relates generally to systems for ultrasonically treating and electrolyzing a liquid, such as an aqueous effluent, more particularly for ultrasonically treating and electrolyzing a flowing liquid, and even more particularly to a system including a treatment chamber for ultrasonically and electrolyzing an aqueous effluent to treat one or more components from the aqueous effluent.

BACKGROUND OF DISCLOSURE

A substantial number of liquids must be treated to meet government laws for release into the environment. For example, many aqueous streams typically contain one or more impurities, such as suspended solids, dissolved organic matter, microorganisms, dissolved mineral matter and the like. Another example is in textile dyeing and printing processes. Specifically, in nearly all textile dyeing and printing processes, some fraction of the applied colorant will not bind to the substrate. These unbound dyes and reactants are typically removed by a water rinsing process, generating large quantities of aqueous effluent that must be disposed of in an environmentally acceptable manner. Furthermore, prior to disposing, the waste water (i.e., aqueous effluent) must often also be treated to kill, remove, and/or oxidize bacteria, spores, and other microorganisms.

Previous attempts have disposed of the components in the aqueous effluents by passing the effluents through continuous chemical reactors such as a plug flow reactor containing adsorbent beads or particles having specific surface functionalities, through which dyes and other waste components found in effluents are adsorbed. Specifically, the beads or particles are packed into a column in the plug flow reactor and an aqueous effluent is pumped through the column, thereby exposing the surface of the beads or particles to allow for adsorption of the components in the effluent to occur. These moieties can be adsorbed onto the surface and within the pores of the beads or particles.

One problem with processing aqueous effluent through a column such as that of a conventional plug flow reactor, is that many of the components to be adsorbed (e.g., dyes and reactants) must travel through a hydrodynamic boundary layer surrounding the bead or particle. This boundary layer is a source of resistance for the components, which prolongs the adsorption process and increases time and costs of the removal of unbound components from aqueous effluents.

One previous attempt to reduce adsorption time required to remove the components from aqueous effluents is by increasing flow rate of the processing stream in the plug flow reactor. This reduces the thickness of the hydrodynamic boundary layer, which enhances the rate at which the transport of components to the surface of the beads and particles can occur. This solution, however, results in less residence time in the plug flow reactor for the adsorption process to occur. Additionally, there is increased pressure drop across the reactor, and as such, larger plug flow reactor geometries and processing equipment are required.

Other attempts have utilized ozone-based decontamination. Historically, however, ozone decontamination has not been used for highly concentrated contaminants because it is difficult to get enough ozone into the water and the capital and energy costs are too high. As such, aqueous effluents having highly concentrated contaminants must be disposed of using alternative methods. For example, waste water from making pesticide and herbicide intermediates, which can have a COD ("Chemical Oxygen Demand") of 10,000 is hauled off and deep well injected as a hazardous waste because the nitrol phenols would otherwise poison the municipal treatment plant. In addition, these high concentration waste fluids are very sudsy. Using a gas, such as ozone, to oxidize the contaminants introduces the problem of stable suds formation pump and consequent cavitation.

Based on the foregoing, there is a need in the art for a treatment system that both prevents a thick hydrodynamic boundary layer from forming, allowing for quicker more efficient removal of components from aqueous effluents, and easily removes even high concentrations of waste components from aqueous effluents.

SUMMARY OF DISCLOSURE

In one aspect, a treatment chamber for treating a liquid generally comprises an elongate housing having longitudinally opposite ends and an interior space. The housing is generally closed at least one of its longitudinal ends and has at least one inlet port for receiving liquid into the interior space of the housing and at least one outlet port through which liquid is exhausted from the housing following ultrasonic treatment of the liquid. The outlet port is spaced longitudinally from the inlet port such that liquid flows longitudinally within the interior space of the housing from the inlet port to the outlet port. An elongate ultrasonic waveguide assembly extends longitudinally within the interior space of the housing and is operable at a predetermined ultrasonic frequency to ultrasonically energize liquid flowing within the housing.

The waveguide assembly comprises an elongate ultrasonic horn disposed at least in part intermediate the inlet port and the outlet port of the housing and has an outer surface located for contact with liquid flowing within the housing from the inlet port to the outlet port. A plurality of discrete agitating members are in contact with and extend transversely outward from the outer surface of the horn intermediate the inlet port and the outlet port in longitudinally spaced relationship with each other. The agitating members and the horn are constructed and arranged for dynamic motion of the agitating members relative to the horn upon ultrasonic vibration of the horn at the predetermined frequency and to operate in an ultrasonic cavitation mode of the agitating members corresponding to the predetermined frequency and the liquid being treated in the chamber. An electrical current source is further in electrical contact with the outer surface of the horn and a sidewall of the housing, thereby producing an electrode potential within the interior space of the housing. In one particularly preferred embodiment, the treatment chamber further includes at least a first insulating member and a second insulating member electrically insulating the housing from the waveguide assembly.

In another aspect, a treatment chamber for treating a liquid generally comprises an elongate housing having longitudinally opposite ends, an interior space, a first inlet port and a second inlet port for receiving liquid into the interior space of the housing and at least one outlet port through which liquid is exhausted from the housing following ultrasonic treatment of the liquid. The outlet port is spaced longitudinally from the first inlet port and the second inlet port such that liquid flows longitudinally within the interior space of the housing from the inlet ports to the outlet port. A first elongate ultrasonic waveguide assembly extends longitudinally within the interior space of the housing and is operable at a first predetermined ultrasonic frequency to ultrasonically energize liquid flowing within the housing. A second elongate ultrasonic waveguide assembly extends longitudinally within the interior space of the housing and is oriented in parallel to the first elongate ultrasonic waveguide assembly. The second waveguide assembly is operable at a second predetermined ultrasonic frequency to ultrasonically energize liquid flowing within the housing.

The first waveguide assembly comprises a first elongate ultrasonic horn disposed at least in part intermediate the first inlet port and the outlet port of the housing and having an outer surface located for contact with liquid flowing within the housing from the inlet port to the outlet port. The second waveguide assembly comprises a second elongate ultrasonic horn disposed at least in part intermediate the second inlet port and the outlet port of the housing and having an outer surface located for contact with liquid flowing within the housing from the second inlet port to the outlet port. The first horn and second horn are each independently constructed for both longitudinal displacement and radial displacement in response to ultrasonic vibration of the first horn and second horn at the first predetermined ultrasonic frequency and the second predetermined ultrasonic frequency, respectively. A plurality of agitating members is in contact with and extends transversely outward from the outer surface of the first horn intermediate the first inlet port and the outlet port. A separate plurality of agitating members is in contact with and extends transversely outward from the outer surface of the second horn intermediate the second inlet port and the outlet port. The agitating members of both the first horn and second horn independently comprise a transverse component extending generally transversely outward from the outer surface of the first horn and second horn. Furthermore, each agitating member of the plurality of agitating members extending outward from the first horn are in longitudinally spaced relationship with each other, and each agitating member of the plurality of agitating members extending outward from the second horn are in longitudinally spaced relationship with each other. An electrical current source is further in electrical contact with the outer surface of the first horn and the outer surface with the second horn, thereby producing an electrode potential within the interior space of the housing. In one particularly preferred embodiment, the treatment chamber further includes at least a first insulating member and a second insulating member electrically insulating the housing from the first waveguide assembly and, additionally, at least a third insulating member and a fourth insulating member electrically insulating the housing from the second waveguide assembly.

In yet another aspect, a treatment chamber for treating a liquid generally comprises an elongate housing having longitudinally opposite ends, an interior space, at least one inlet port for receiving liquid into the interior space of the housing and at least one outlet port through which liquid is exhausted from the housing following ultrasonic treatment of the liquid. The outlet port is spaced laterally from the inlet port such that liquid flows laterally within the interior space of the housing from the inlet port to the outlet port. A first elongate ultrasonic waveguide assembly extends laterally within the interior space of the housing and is operable at a first predetermined ultrasonic frequency to ultrasonically energize liquid flowing within the housing. A second elongate ultrasonic waveguide assembly extends laterally within the interior space of the house and is oriented laterally to the first elongate ultrasonic waveguide assembly. The second waveguide assembly is operable at a second predetermined ultrasonic frequency to ultrasonically energize liquid flowing within the housing.

The first waveguide assembly comprises a first elongate ultrasonic horn disposed at least in part intermediate the inlet port and the outlet port of the housing and having an outer surface located for contact with liquid flowing within the housing from the inlet port to the outlet port. The second waveguide assembly comprises a second elongate ultrasonic horn disposed at least in part intermediate the inlet port and the outlet port of the housing and having an outer surface located for contact with liquid flowing within the housing from the second inlet port to the outlet port. The first horn and second horn are each independently constructed for both lateral displacement and axial displacement in response to ultrasonic vibration of the first horn and second horn at the first predetermined ultrasonic frequency and the second predetermined ultrasonic frequency, respectively. A plurality of agitating members is in contact with and extends transversely outward from the outer surface of the first horn intermediate the inlet port and the outlet port. A separate plurality of agitating members is in contact with and extends transversely outward from the outer surface of the second horn intermediate the inlet port and the outlet port. The agitating members of both the first horn and second horn independently comprise a transverse component extending generally transversely outward from the outer surface of the first horn and second horn. Furthermore, each agitating member of the plurality of agitating members extending outward from the first horn are in laterally spaced relationship with each other, and each agitating member of the plurality of agitating members extending outward from the second horn are in laterally spaced relationship with each other. An electrical current source is further in electrical contact with the outer surface of the first horn and the outer surface with the second horn, thereby producing an electrode potential within the interior space of the housing.

In still another aspect, a treatment chamber for treating a liquid generally comprises an elongate housing having longitudinally opposite ends, an interior space, at least one inlet port for receiving liquid into the interior space of the housing and at least one outlet port through which liquid is exhausted from the housing following ultrasonic treatment of the liquid. The outlet port is spaced laterally from the inlet port such that liquid flows laterally within the interior space of the housing from the inlet port to the outlet port. A first elongate ultrasonic waveguide assembly extends laterally within the interior space of the housing and is operable at a first predetermined ultrasonic frequency to ultrasonically energize liquid flowing within the housing. A second elongate ultrasonic waveguide assembly extends laterally within the interior space of the house and is oriented laterally to the first elongate ultrasonic waveguide assembly. The second waveguide assembly is operable at a second predetermined ultrasonic frequency to ultrasonically energize liquid flowing within the housing.

The first waveguide assembly comprises a first elongate ultrasonic horn disposed at least in part intermediate the inlet port and the outlet port of the housing and having an outer surface located for contact with liquid flowing within the housing from the inlet port to the outlet port. The second waveguide assembly comprises a second elongate ultrasonic horn disposed at least in part intermediate the inlet port and the outlet port of the housing and having an outer surface located for contact with liquid flowing within the housing from the second inlet port to the outlet port. The second horn is configured as a hollow cylinder, wherein the first horn is disposed between the sides of the second horn. The first horn and second horn are each independently constructed for both lateral displacement and axial displacement in response to ultrasonic vibration of the first horn and second horn at the first predetermined ultrasonic frequency and the second predetermined ultrasonic frequency, respectively. A plurality of agitating members is in contact with and extends transversely outward from the outer surface of the first horn intermediate the inlet port and the outlet port. A separate plurality of agitating members is in contact with and extends transversely outward from the outer surface of the second horn intermediate the inlet port and the outlet port. The agitating members of both the first horn and second horn independently comprise a transverse component extending generally transversely outward from the outer surface of the first horn and second horn. Furthermore, each agitating member of the plurality of agitating members extending outward from the first horn are in laterally spaced relationship with each other, and each agitating member of the plurality of agitating members extending outward from the second horn are in laterally spaced relationship with each other. An electrical current source is further in electrical contact with the outer surface of the first horn and at least one of the first arm member and second arm member of the second horn, thereby producing an electrode potential within the interior space of the housing.

Other features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
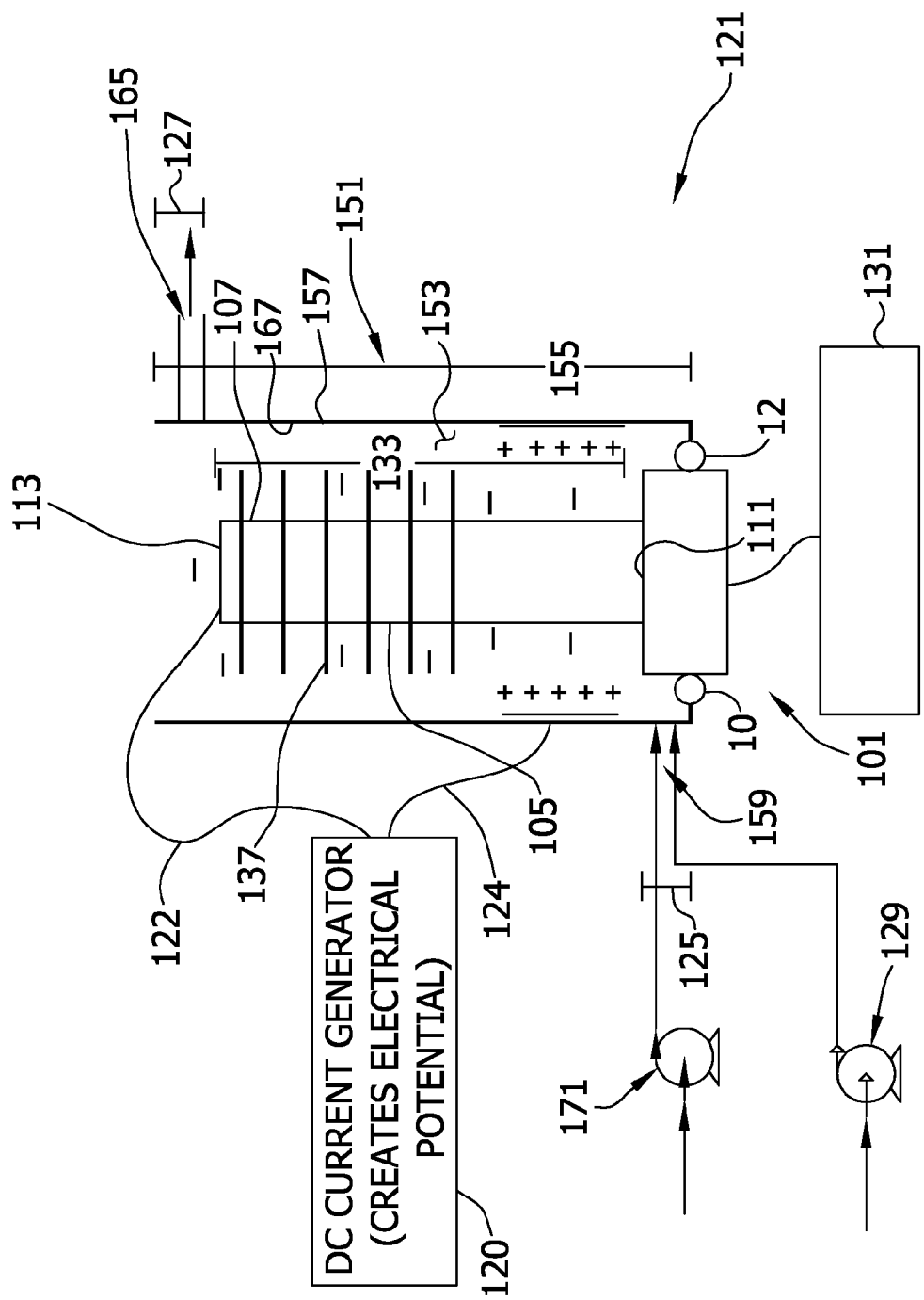
FIG. 1 is a schematic of a treatment chamber according to one embodiment of the present disclosure for ultrasonically treating and electrolyzing a liquid.

With particular reference now to FIG. 1, in one embodiment a system for treating a liquid generally comprises a treatment chamber, generally indicated at 121, that is operable to ultrasonically treat and electrolyze a liquid. It should be understood that when the treatment chamber of the present disclosure is used in some applications, the liquid will not be electrolyzed. For example, when the treatment chamber is used for mixing components together, electrolysis is not needed or desired. However, having electrode-like properties, the treatment chamber can improve the mixing of components and other chemical reactions. Specifically, it has been found that many reactions not easily or even impossible to make chemically, can easily and conveniently be produced electrochemically (e.g., producing reactive species such as superoxide ions, hydroxyl radicals, peroxides, carbon dioxide anion radicals, hydrogen atoms, metal hydrides, halogens, and the like). Furthermore, processing liquids and reactions through electrochemical processing can provide various other advantages, including, significantly less energy is required; it is a less hazardous process; polluting byproducts required in disposal are minimized or eliminated; process is more simplified as compared to a multi-step chemical reaction; and cheaper and more readily available starting materials.

The term "liquid" as used herein is intended to refer to a single component liquid, a solution comprised of two or more components in which at least one of the components is a liquid such as a liquid-liquid mixture, a liquid-gas mixture or a liquid in which particulate matter is entrained, or other viscous fluids.

The treatment chamber 121 is illustrated schematically in FIG. 1 and further described herein with reference to use of the treatment chamber to remove one or more components of the liquid solution by applying ultrasonic energy to the solution within the chamber; the chamber, of which having an electrode potential, and more particularly to electrolyzing solutions (e.g., degrading compounds such as water and ammonia into less complex components (e.g., oxygen, nitrogen, hydrogen, and the like) and for the reduction of metal ions to precipitate the metals out of solution (e.g., gold, copper, silver, and the like)) in the liquid solutions and then removing one or more of the components from the liquid solution). It is also understood that the treatment chamber 121 may be used in liquid treatment systems other than for electrolyzing solutions but where ultrasonic agitation of the liquid at least in part comprises the desired treatment of the liquid.

In particular, the treatment chamber 121 is suitable for use in liquid treatment systems in which ultrasonic agitation of the liquid solution (in combination with the subjection of the solution to an electrode potential, as discussed more fully below) is desired in an in-line, e.g., continuous flow process in which fluid flows continuously through the chamber. For example, in one specific application, as noted above, waste water is treated to kill, remove, and/or oxidize microorganisms prior to being disposed. The treatment chamber of the present disclosure may accomplish this through the sparging of ozone gas into the chamber along with the addition of hydrogen peroxide. Additionally, the ultrasonic horn, as described below, operates in a cavitational mode to enhance the sonochemistries between the compounds within the waste water, the ozone gas, and hydrogen peroxide. As the treatment chamber of the present disclosure is further charged as an electrode-type system, the chamber can further induce the redox reaction to remove the compounds from the waste water.

Examples of other contemplated uses of the ultrasonic treatment chamber include, without limitation, mixing solutions, paints and other viscous materials (e.g., ink solutions); food processing and treatment; degassing solutions (e.g., such as gasses like oxygen, nitrogen, and etc.); and enhancing chemical reactions, for example, as is common in sonochemistry where excitation is imparted to a chemical reaction to expedite the reaction. It is contemplated, though, that the treatment chamber 121 may be used in a liquid treatment system in which liquid is treated in accordance with a batch process instead of a continuous flow process and remain within the scope of this disclosure.

Additional examples of contemplated uses for the treatment chamber 121 include, without limitation, mixing resins and curing agents for the plastic industry; mixing pulp slurries with chemical additives such as bleaching agents, wet strength agents, starches, dyes, enzymes, fillers, anti-slime agents, silicone additives, etc.; mixing compounds used in the paper and tissue industries, such as clay slurries for coatings, polymeric additives such as wet strength resins, starch suspensions, silicone compounds, lotions, filler suspensions, etc.; mixing resins and coloring agents, fillers, and other compounds; mixing immiscible phases to prepare emulsions, such as food emulsions, cosmetics (e.g., for sun block products, hand lotions, lipstick compounds, etc.), cleaning agents (including nanoemulsions of oil and water), pharmaceutical compounds, etc; and mixing coloring agents and other compounds to form cosmetics such as hair dyes.

Other contemplated uses of the treatment chamber 121 include, without limitation, degassing a mixture to simplify subsequent treatment and reduce void formation; deinking recycled papermaking fibers, in which ultrasonic energy (in combination with electrolysis) may assist in removal of inks (particularly in the presence of enzymes, detergents, or other chemicals); hydrogenating oils, cheese, or other food stuffs, in which gases and slurries or liquids must be mixed; homogenizing milk and other compounds; incorporating into bioreactors and fermentation units, in which delicate cells must be mixed with nutrients and other compounds without intense mechanical shear that might damage cells; treating wastewater and/or manure, in which a variety of additives and air bubbles may need to be mixed with a slurry; manufacturing petrochemicals such as lubricant mixtures, gasoline blends, wax mixtures, etc., and compounds derived from petrochemicals; processing dough (e.g., mixing combinations of agents to be added to flour or processing the dough itself, which may result in improved breakdown of gluten, etc.). The treatment chamber 21 may also be used in chemical reactors involving single or multiple phases, including slurries.

In other contemplated uses, the treatment chamber 121 may be used to remove entrapped gas bubbles from coating solutions that are used in gravure coating, meyer rod coating or any other coating applications where it is desirable to remove air bubbles from a solution.

In one particularly preferred embodiment, as illustrated in FIG. 1, the treatment chamber 121 is generally elongate and has a general inlet end 125 (a lower end in the orientation of the illustrated embodiment) and a general outlet end 127 (an upper end in the orientation of the illustrated embodiment). The treatment chamber 121 is configured such that fluid (e.g., liquid solution; also referred to herein as aqueous effluent in some embodiments) enters the treatment chamber 121 generally at the inlet end 125 thereof, flows generally longitudinally within the chamber (e.g., upward in the orientation of illustrated embodiment) and exits the chamber generally at the outlet end 127 of the chamber.

The terms "upper" and "lower" are used herein in accordance with the vertical orientation of the treatment chamber 121 illustrated in the various drawings and are not intended to describe a necessary orientation of the chamber in use. That is, while the chamber 121 is most suitably oriented vertically, with the outlet end 127 of the chamber above the inlet end 125 as illustrated in the various drawings, it is understood that the chamber may be oriented with the inlet end above the outlet end, or it may be oriented other than in a vertical orientation (see FIGS. 4-6) and remain within the scope of this disclosure.

The terms "axial" and "longitudinal" refer directionally herein to the vertical direction of the chamber 121 (e.g., end-to-end such as the vertical direction in the illustrated embodiment of FIG. 1). The terms "transverse", "lateral" and "radial" refer herein to a direction normal to the axial (e.g., longitudinal) direction. The terms "inner" and "outer" are also used in reference to a direction transverse to the axial direction of the treatment chamber 121, with the term "inner" referring to a direction toward the interior of the chamber and the term "outer" referring to a direction toward the exterior of the chamber.

The inlet end 125 of the treatment chamber 121 is in fluid communication with a suitable delivery system, generally indicated at 129, that is operable to direct one or more liquid solutions to, and more suitably through, the chamber 121. Although not illustrated, it should be understood by one skilled in the art that the delivery system 129 may comprise one or more pumps operable to pump the respective solutions from a corresponding source thereof to the inlet end 125 of the chamber 121 via suitable conduits (not shown).

It is understood that the delivery system 129 may be configured to deliver more than one liquid solution, such as when mixing liquid solutions, to the treatment chamber 121 without departing from the scope of this disclosure. It is also contemplated that delivery systems other than that illustrated in FIG. 1 and described herein may be used to deliver one or more solutions to the inlet end 125 of the treatment chamber 121 without departing from the scope of this disclosure.

Furthermore, the inlet end 125 may be in fluid communication with an air sparge, generally indicated at 171, designed to force air into the interior of the housing. The air sparge 171 facilitates the flow of liquid transversely inward toward the horn to thereby facilitate ultrasonic energization (i.e., agitation) of the liquid. Typically, the air is forced through a porous media so as to create small air bubbles. Desirably, the air sparged used in the treatment chamber has a gas diffuser porosity rated from medium to fine and a gas flow rate of from about 0.01 liters per minute to about 100 liters per minute and, more suitably, from about 10 liters per minute to about 50 liters per minute. Furthermore, the air sparge forces air into the interior of the housing at a gas pressure of from about 0.2 psi to about 100 psi and, more suitably, from about 10 psi to about 50 psi, depending upon the desired gas flow rate and back pressure of the treatment system.

Figure 2A:
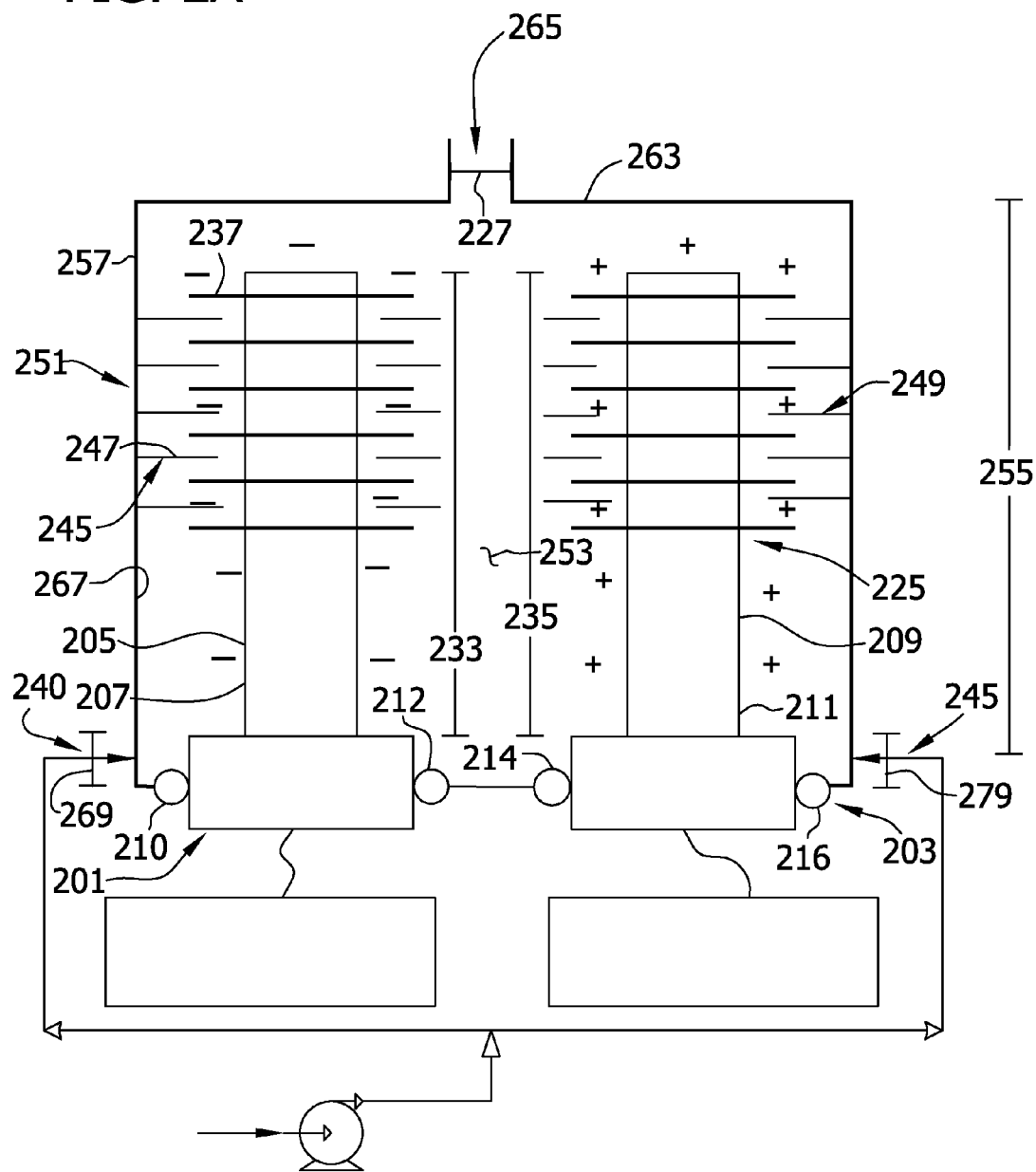
FIG. 2A is a schematic of a treatment chamber according to a second embodiment of the present disclosure for ultrasonically treating and electrolyzing a liquid.

Still referring to FIG. 1, the treatment chamber 121 comprises a housing 151 defining an interior space 153 of the chamber 121 through which liquid delivered to the chamber flows from the inlet end 125 to the outlet end 127 thereof. The housing 151 suitably comprises an elongate tube 155 generally defining, at least in part, a sidewall 157 of the chamber 121. The tube 155 may have one or more inlet ports (one such inlet port being illustrated in FIG. 1 and indicated at 159) formed therein through which one or more solutions to be treated within the chamber 121 are delivered to the interior space 153 thereof. It should be understood by one skilled in the art that the inlet end of the housing may include more than one port. For example, although not shown, the housing may comprise two inlet ports, wherein the first inlet port and the second inlet port are suitably in parallel, spaced relationship with each other. Furthermore, as illustrated in FIG. 2A, the housing may comprise two inlet ends 269 and 279. The two inlet ends 269 and 279 may further independently include at least one inlet port (indicated generally at 235 and 245, respectively).

Moreover, in one suitable embodiment, the housing further comprises an inlet collar (not shown) that is connected to and mounted on one end of the tube to further define (along with the inlet port) the inlet end of the chamber. The inlet collar at the inlet end of the chamber is generally annular and has at least one, and more suitably a plurality of inlet ports formed therein for receiving liquid solutions into the interior space of the chamber. At least one inlet port is oriented generally tangentially relative to the annular collar so that liquid flows into the interior space of the chamber generally tangentially thereto to impart a swirling action to liquid as it enters the chamber. More suitably, a pair of inlet ports is arranged in parallel alignment with each and extends generally tangentially relative to the annular collar, with one port being designated herein as the outer inlet port and the other port being designated the inner inlet port.

This dual tangential inlet port arrangement is particularly useful for initiating mixing of two or more components together before the liquid solution is further subjected to ultrasonic treatment and electrolysis within the chamber. In a particularly suitable use of this arrangement, where the liquid to be treated in the chamber comprises two or more liquids, the liquid having the lowest viscosity is directed to flow into the chamber via the outer inlet port while the liquid having the highest viscosity is directed to flow into the chamber via the inner inlet port. The flow of the lower viscosity ingredient through the outer inlet port has a tendency to draw the higher viscosity ingredient into the interior space of the chamber to speed the rate at which the higher viscosity ingredient is introduced into the chamber.

This action, combined with the swirling action resulting from the tangential direction in which the liquid components are directed into the chamber, facilitate an initial mixing of these two components before the liquid solution flows further through the chamber for ultrasonic and electric treatment. If additional components are to be added to the mixture, such components may be delivered into the interior space of the chamber via the inlet port formed in the chamber sidewall. The collar may also have an additional tangential set of inlet ports and a pair of generally vertically oriented inlet ports. It is understood, however, that none of the ports need to be oriented tangentially relative to the collar to remain within the scope of this disclosure. It is also contemplated that the collar may be omitted altogether such that all components to be mixed together are delivered to the inlet port formed in the chamber sidewall.

With reference to FIG. 2A, in one embodiment, the housing 251 may comprise a closure 263 connected to and substantially closing the longitudinally opposite end of the sidewall 257, and having at least one outlet port 265 therein to generally define the outlet end 227 of the treatment chamber 221. The sidewall 257 (e.g., defined by the elongate tube 255) of the chamber 221 has an inner surface 267 that together with the waveguide assembly (or waveguide assemblies described further below, and generally indicated at 201 and 203) and the closure 263 define the interior space 253 of the chamber. In the illustrated embodiment, the tube 255 is generally cylindrical so that the chamber sidewall 257 is generally annular in cross-section. However, it is contemplated that the cross-section of the chamber sidewall 257 may be other than annular, such as polygonal or another suitable shape, and remains within the scope of this disclosure. The chamber sidewall 257 of the illustrated chamber 221 is suitably constructed of a transparent material, although it is understood that any suitable material may be used as long as the material is compatible with the liquid solutions being treated in the chamber, the pressure at which the chamber is intended to operate, and other environmental conditions within the chamber such as temperature.

Figure 4:
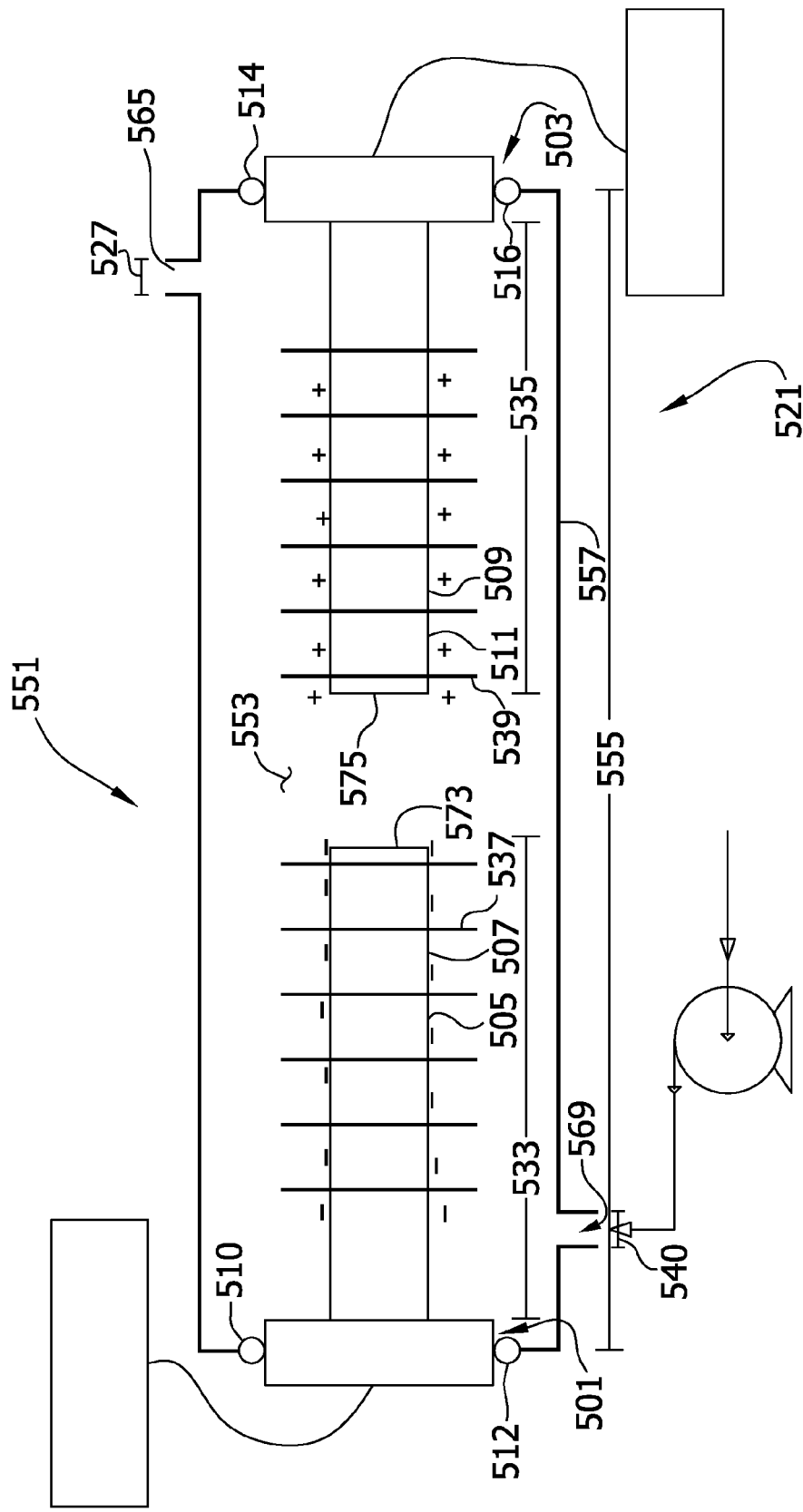
FIG. 4 is a schematic of a treatment chamber according to a fourth embodiment of the present disclosure for ultrasonically treating and electrolyzing a liquid.
Figure 5:
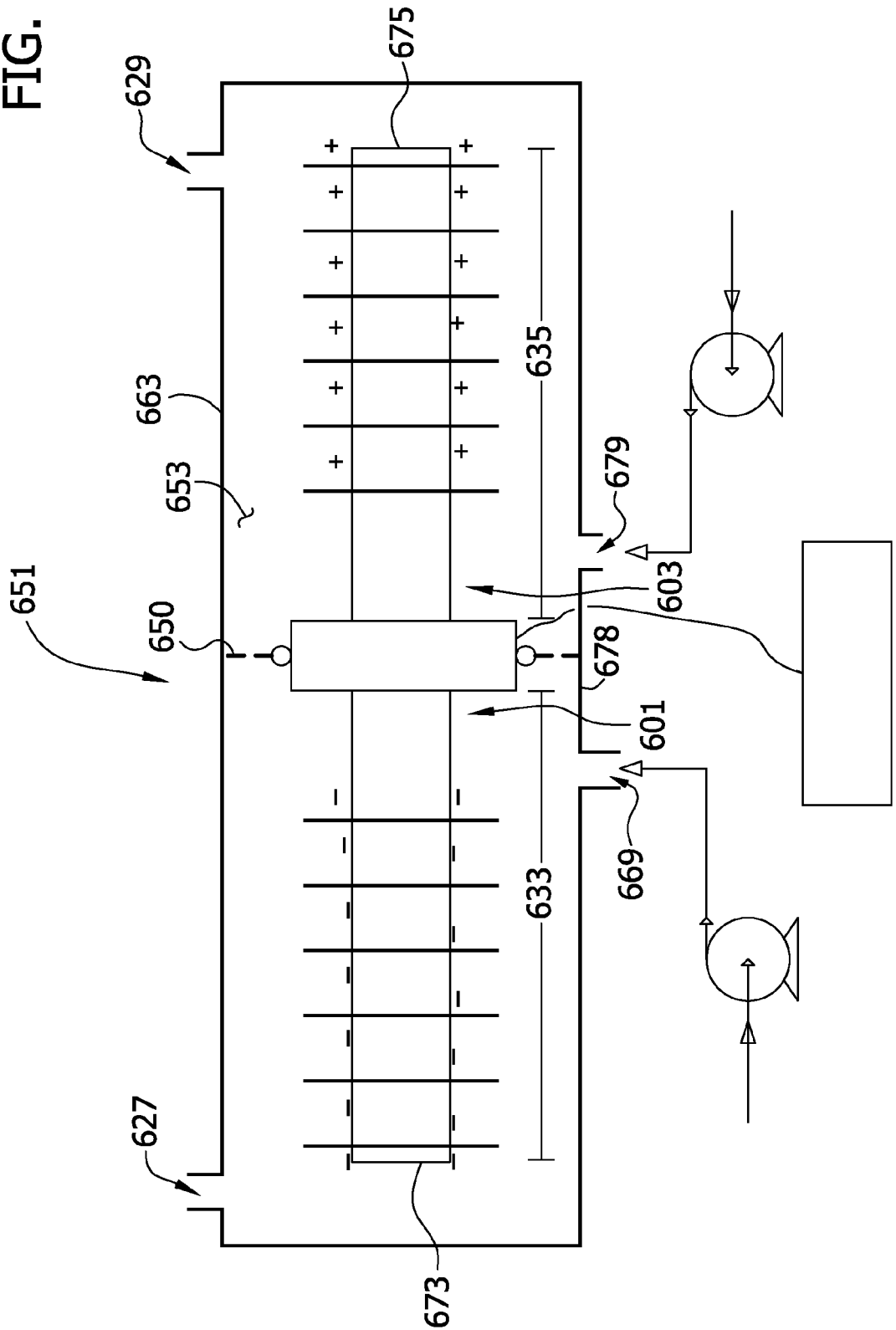
FIG. 5 is a schematic of a treatment chamber according to a fifth embodiment of the present disclosure for ultrasonically treating and electrolyzing a liquid.
Figure 6:
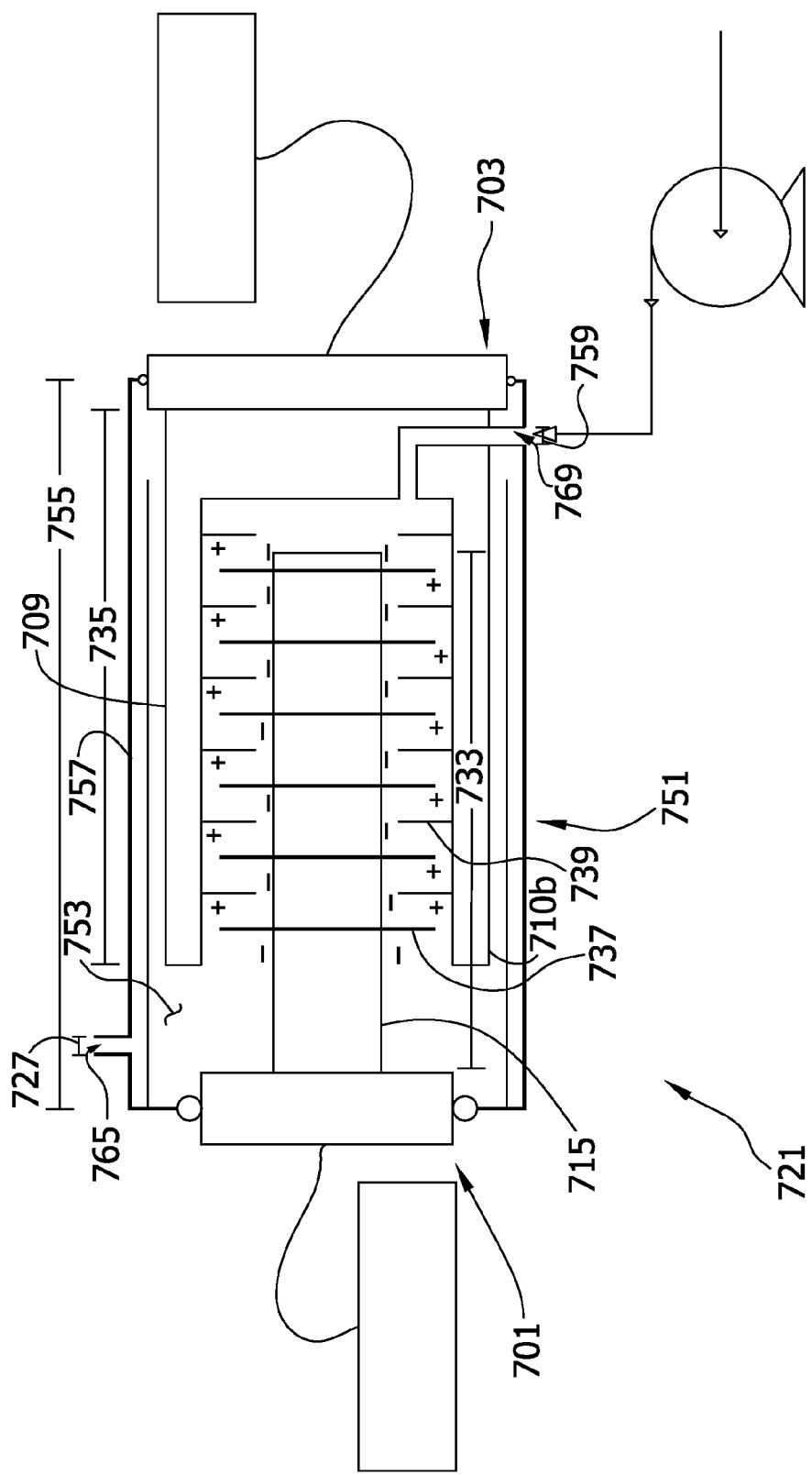
FIG. 6 is a schematic of a treatment chamber according to a sixth embodiment of the present disclosure for ultrasonically treating and electrolyzing a liquid.

Referring back to FIG. 1, a waveguide assembly, generally indicated at 101, extends longitudinally at least in part within the interior space 153 of the chamber 121 to ultrasonically energize liquid (and any other components of the liquid solution) flowing through the interior space 153 of the chamber 121. In particular, the waveguide assembly 101 of the illustrated embodiment extends longitudinally from the lower or inlet end 125 of the chamber 121 up into the interior space 153 thereof to a terminal end 113 of the waveguide assembly disposed intermediate the inlet port (e.g., inlet port 159 where it is present). Although illustrated in FIGS. 1 and 2A as extending longitudinally into the interior space 153 of the chamber 121, it should be understood by one skilled in the art, and more particularly as illustrated in FIGS. 4-6, the waveguide assembly may extend laterally from a housing sidewall of the chamber, running horizontally through the interior space thereof. Typically, the waveguide assembly 101 is mounted, either directly or indirectly, to the chamber housing 151 as will be described later herein.

Still referring to FIG. 1, the waveguide assembly 101 suitably comprises an elongate horn assembly, generally indicated at 133, disposed entirely with the interior space 153 of the housing 151 intermediate the inlet port 159 and the outlet port 165 for complete submersion within the liquid being treated within the chamber 121, and more suitably, in the illustrated embodiment, it is aligned coaxially with the chamber sidewall 157. The horn assembly 133 has an outer surface 107 that together with the inner surface 167 of the sidewall 157 defines a flow path within the interior space 153 of the chamber 121 along which liquid and other components flow past the horn within the chamber (this portion of the flow path being broadly referred to herein as the ultrasonic treatment zone). The horn assembly 133 has an upper end defining a terminal end of the horn assembly (and therefore the terminal end 113 of the waveguide assembly) and a longitudinally opposite lower end 111. Although not shown, it is particularly preferable that the waveguide assembly 101 also comprises a booster coaxially aligned with and connected at an upper end thereof to the lower end 111 of the horn assembly 133. It is understood, however, that the waveguide assembly 101 may comprise only the horn assembly 133 and remain within the scope of this disclosure. It is also contemplated that the booster may be disposed entirely exterior of the chamber housing 151, with the horn assembly 133 mounted on the chamber housing 151 without departing from the scope of this disclosure.

The waveguide assembly 101, and more particularly the booster is suitably mounted on the chamber housing 151, e.g., on the tube 155 defining the chamber sidewall 157, at the upper end thereof by a mounting member (not shown) that is configured to vibrationally isolate the waveguide assembly (which vibrates ultrasonically during operation thereof) from the treatment chamber housing. That is, the mounting member inhibits the transfer of longitudinal and transverse mechanical vibration of the waveguide assembly 101 to the chamber housing 151 while maintaining the desired transverse position of the waveguide assembly (and in particular the horn assembly 133) within the interior space 153 of the chamber housing and allowing both longitudinal and transverse displacement of the horn assembly within the chamber housing. The mounting member also at least in part (e.g., along with the booster and/or lower end of the horn assembly) closes the inlet end 125 of the chamber 121. Examples of suitable mounting member configurations are illustrated and described in U.S. Pat. No. 6,676,003, the entire disclosure of which is incorporated herein by reference to the extent it is consistent herewith.

In one particularly suitable embodiment the mounting member is of single piece construction. Even more suitably the mounting member may be formed integrally with the booster (and more broadly with the waveguide assembly 101). However, it is understood that the mounting member may be constructed separately from the waveguide assembly 101 and remain within the scope of this disclosure. It is also understood that one or more components of the mounting member may be separately constructed and suitably connected or otherwise assembled together.

In one suitable embodiment, the mounting member is further constructed to be generally rigid (e.g., resistant to static displacement under load) so as to hold the waveguide assembly 101 in proper alignment within the interior space 153 of the chamber 121. For example, the rigid mounting member in one embodiment may be constructed of a non-elastomeric material, more suitably metal, and even more suitably the same metal from which the booster (and more broadly the waveguide assembly 101) is constructed. The term "rigid" is not, however, intended to mean that the mounting member is incapable of dynamic flexing and/or bending in response to ultrasonic vibration of the waveguide assembly 101. In other embodiments, the rigid mounting member may be constructed of an elastomeric material that is sufficiently resistant to static displacement under load but is otherwise capable of dynamic flexing and/or bending in response to ultrasonic vibration of the waveguide assembly 101.

A suitable ultrasonic drive system 131 including at least an exciter (not shown) and a power source (not shown) is disposed exterior of the chamber 121 and operatively connected to the booster (not shown) (and more broadly to the waveguide assembly 101) to energize the waveguide assembly to mechanically vibrate ultrasonically. Examples of suitable ultrasonic drive systems 131 include a Model 20A3000 system available from Dukane Ultrasonics of St. Charles, Ill., and a Model 2000CS system available from Herrmann Ultrasonics of Schaumberg, Ill.

In one embodiment, the drive system 131 is capable of operating the waveguide assembly 101 at a frequency in the range of about 15 kHz to about 100 kHz, more suitably in the range of about 15 kHz to about 60 kHz, and even more suitably in the range of about 20 kHz to about 40 kHz. Such ultrasonic drive systems 131 are well known to those skilled in the art and need not be further described herein.

With particular reference to FIG. 1, the horn assembly 133 comprising an elongate, generally cylindrical horn 105 having an outer surface 107, and two or more (i.e., a plurality of) agitating members 137 connected to the horn and extending at least in part transversely outward from the outer surface of the horn in longitudinally spaced relationship with each other. The horn 105 is suitably sized to have a length equal to about one-half of the resonating wavelength (otherwise commonly referred to as one-half wavelength) of the horn. In one particular embodiment, the horn 105 is suitably configured to resonate in the ultrasonic frequency ranges recited previously, and most suitably at 20 kHz. For example, the horn 105 may be suitably constructed of a titanium alloy (e.g., Ti6Al4V) and sized to resonate at 20 kHz. The one-half wavelength horn 105 operating at such frequencies thus has a length (corresponding to a one-half wavelength) in the range of about 4 inches to about 6 inches, more suitably in the range of about 4.5 inches to about 5.5 inches, even more suitably in the range of about 5.0 inches to about 5.5 inches, and most suitably a length of about 5.25 inches (133.4 mm). It is understood, however, that the ultrasonic treatment chamber 121 may include a horn 105 sized to have any increment of one-half wavelength without departing from the scope of this disclosure.

Figure 7:
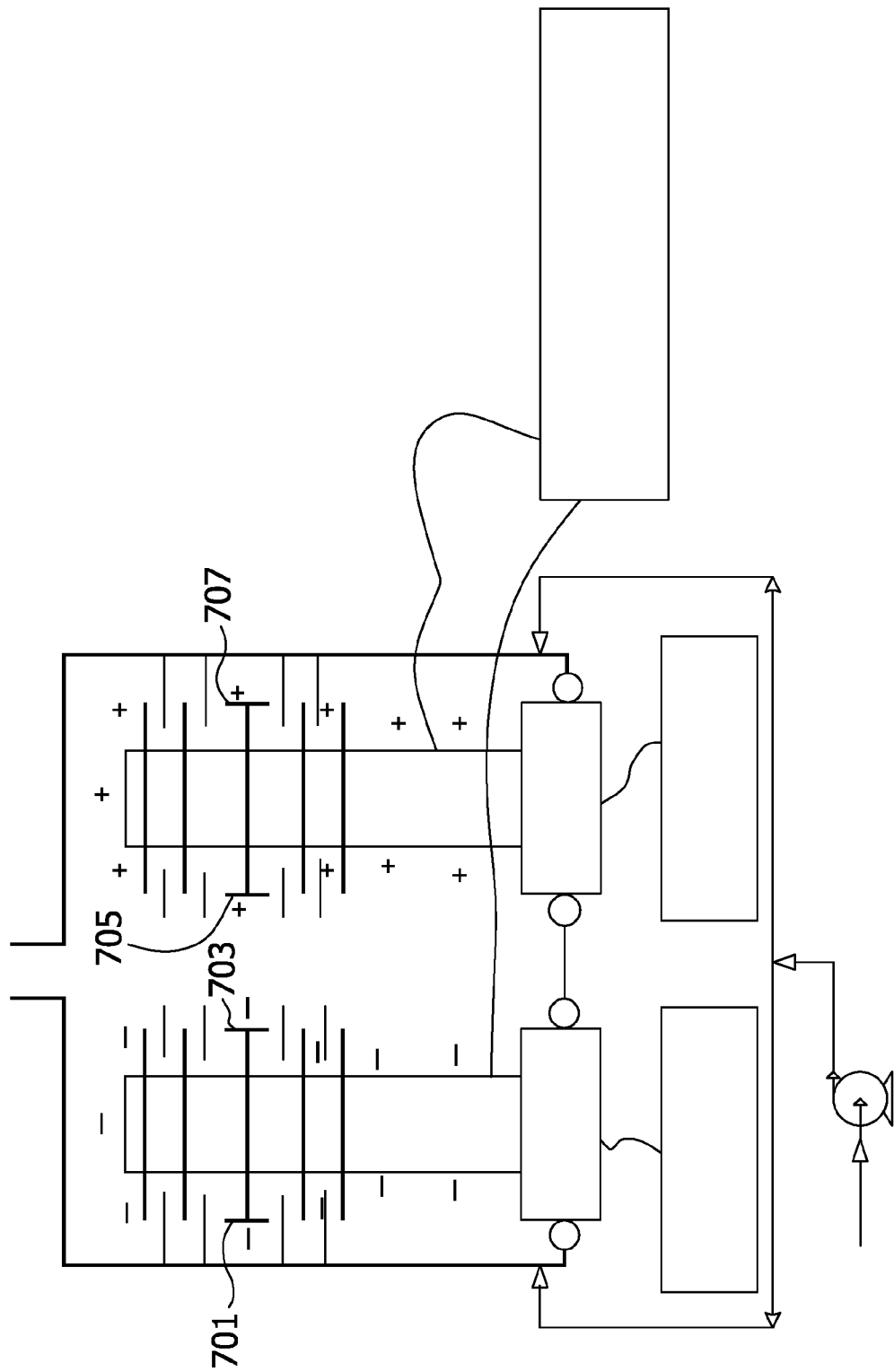
FIG. 7 is a schematic of a treatment chamber according to a seventh embodiment of the present disclosure for ultrasonically treating and electrolyzing a liquid.

In the illustrated embodiment, the agitating members 137 comprise a series of six washer-shaped rings that extend continuously about the circumference of the horn 105 in longitudinally spaced relationship with each other and transversely (e.g., radially in the illustrated embodiment) outward from the outer surface of the horn. In this manner the vibrational displacement of each of the agitating members 137 relative to the horn 105 is relatively uniform about the circumference of the horn. It is understood, however, that the agitating members 137 need not each be continuous about the circumference of the horn 105. For example, the agitating members 137 may instead be in the form of spokes, blades, fins or other discrete structural members that extend transversely outward from the outer surface 107 of the horn 105. For example, as illustrated in FIG. 7, two of the six agitating members are in a T-shape 701, 703, 705, and 707. Specifically, the two agitating members surrounding the nodal region, as described more fully below, are in a T-shape. It has been found that members in the T-shape, generate a strong radial (e.g., horizontal) acoustic wave that further increases the cavitation effect as described more fully herein.

By way of a dimensional example, the horn assembly 133 of the illustrated embodiment of FIG. 1 has a length of about 5.25 inches (133.4 mm), one of the rings 137 is suitably disposed adjacent the terminal end 113 of the horn 105 (and hence of the waveguide assembly 101), and more suitably is longitudinally spaced approximately 0.063 inches (1.6 mm) from the terminal end of the horn 105. In other embodiments the uppermost ring 137 may be disposed at the terminal end of the horn 105 and remain within the scope of this disclosure. The rings 137 are each about 0.125 inches (3.2 mm) in thickness and are longitudinally spaced from each other (between facing surfaces of the rings) a distance of about 0.875 inches (22.2 mm).

It is understood that the number of agitating members 137 (e.g., the rings in the illustrated embodiment) may be less than or more than six without departing from the scope of this disclosure. It is also understood that the longitudinal spacing between the agitating members 137 may be other than as illustrated in FIG. 1 and described above (e.g., either closer or spaced further apart). Furthermore, while the rings 137 illustrated in FIG. 1 are equally longitudinally spaced from each other, it is alternatively contemplated that where more than two agitating members are present the spacing between longitudinally consecutive agitating members need not be uniform to remain within the scope of this disclosure. Furthermore, as illustrated in FIGS. 4-6, when the waveguide assembly extends laterally within the interior space of the chamber, the agitating members may be laterally spaced from one another.

In particular, the locations of the agitating members 137 are at least in part a function of the intended vibratory displacement of the agitating members upon vibration of the horn assembly 133. For example, in the illustrated embodiment of FIG. 1, the horn assembly 133 has a nodal region located generally longitudinally centrally of the horn 105 (e.g., between the third and fourth rings). As used herein and more particularly shown in FIG. 1, the "nodal region" of the horn 105 refers to a longitudinal region or segment of the horn member along which little (or no) longitudinal displacement occurs during ultrasonic vibration of the horn and transverse (e.g., radial in the illustrated embodiment) displacement of the horn is generally maximized. Transverse displacement of the horn assembly 133 suitably comprises transverse expansion of the horn but may also include transverse movement (e.g., bending) of the horn. Likewise, in FIGS. 4-6, in which the horn runs laterally within the interior space of the chamber housing, the "nodal region" refers to a lateral region or segment of the horn member along which little (or no) lateral displacement occurs during ultrasonic vibration of the horn and axial (e.g., longitudinal in the illustrated embodiment) displacement of the horn is generally maximized.

In the illustrated embodiment of FIG. 1, the configuration of the one-half wavelength horn 105 is such that the nodal region is particularly defined by a nodal plane (i.e., a plane transverse to the horn member at which no longitudinal displacement occurs while transverse displacement is generally maximized) is present. This plane is also sometimes referred to as a "nodal point". Accordingly, agitating members 137 (e.g., in the illustrated embodiment, the rings) that are disposed longitudinally further from the nodal region of the horn 105 will experience primarily longitudinal displacement while agitating members that are longitudinally nearer to the nodal region will experience an increased amount of transverse displacement and a decreased amount of longitudinal displacement relative to the longitudinally distal agitating members.

It is understood that the horn 105 may be configured so that the nodal region is other than centrally located longitudinally on the horn member without departing from the scope of this disclosure. It is also understood that one or more of the agitating members 137 may be longitudinally located on the horn so as to experience both longitudinal and transverse displacement relative to the horn upon ultrasonic vibration of the horn 105.

Still referring to FIG. 1, the agitating members 137 are sufficiently constructed (e.g., in material and/or dimension such as thickness and transverse length, which is the distance that the agitating member extends transversely outward from the outer surface 107 of the horn 105) to facilitate dynamic motion, and in particular dynamic flexing/bending of the agitating members in response to the ultrasonic vibration of the horn. In one particularly suitable embodiment, for a given ultrasonic frequency at which the waveguide assembly 101 is to be operated in the treatment chamber (otherwise referred to herein as the predetermined frequency of the waveguide assembly) and a particular liquid to be treated within the chamber 121, the agitating members 137 and horn 105 are suitably constructed and arranged to operate the agitating members in what is referred to herein as an ultrasonic cavitation mode at the predetermined frequency.

As used herein, the ultrasonic cavitation mode of the agitating members refers to the vibrational displacement of the agitating members sufficient to result in cavitation (i.e., the formation, growth, and implosive collapse of bubbles in a liquid) of the liquid being treated at the predetermined ultrasonic frequency. For example, where the liquid flowing within the chamber comprises an aqueous effluent, and more particularly water, and the ultrasonic frequency at which the waveguide assembly 101 is to be operated (i.e., the predetermined frequency) is about 20 kHZ, one or more of the agitating members 137 are suitably constructed to provide a vibrational displacement of at least 1.75 mils (i.e., 0.00175 inches, or 0.044 mm) to establish a cavitation mode of the agitating members. It is understood that the waveguide assembly 101 may be configured differently (e.g., in material, size, etc.) to achieve a desired cavitation mode associated with the particular liquid being treated. For example, as the viscosity of the liquid being treated changes, the cavitation mode of the agitating members may need to be changed.

In particularly suitable embodiments, the cavitation mode of the agitating members corresponds to a resonant mode of the agitating members whereby vibrational displacement of the agitating members is amplified relative to the displacement of the horn. However, it is understood that cavitation may occur without the agitating members operating in their resonant mode, or even at a vibrational displacement that is greater than the displacement of the horn, without departing from the scope of this disclosure.

In one suitable embodiment, a ratio of the transverse length of at least one and more suitably all of the agitating members to the thickness of the agitating member is in the range of about 2:1 to about 6:1. As another example, the rings each extend transversely outward from the outer surface 107 of the horn 105 a length of about 0.5 inches (12.7 mm) and the thickness of each ring is about 0.125 inches (3.2 mm), so that the ratio of transverse length to thickness of each ring is about 4:1. It is understood, however that the thickness and/or the transverse length of the agitating members may be other than that of the rings as described above without departing from the scope of this disclosure. Also, while the agitating members 137 (rings) may suitably each have the same transverse length and thickness, it is understood that the agitating members may have different thicknesses and/or transverse lengths.

In the above described embodiment, the transverse length of the agitating member also at least in part defines the size (and at least in part the direction) of the flow path along which liquid or other flowable components in the interior space of the chamber flows past the horn. For example, the horn may have a radius of about 0.875 inches (22.2 mm) and the transverse length of each ring is, as discussed above, about 0.5 inches (12.7 mm). The radius of the inner surface of the housing sidewall is approximately 1.75 inches (44.5 mm) so that the transverse spacing between each ring and the inner surface of the housing sidewall is about 0.375 inches (9.5 mm). It is contemplated that the spacing between the horn outer surface and the inner surface of the chamber sidewall and/or between the agitating members and the inner surface of the chamber sidewall may be greater or less than described above without departing from the scope of this disclosure.

In general, the horn 105 may be constructed of a metal having suitable acoustical and mechanical properties. Examples of suitable metals for construction of the horn 105 include, without limitation, aluminum, monel, titanium, stainless steel, and some alloy steels. It is also contemplated that all or part of the horn 105 may be coated with another metal such as silver, platinum, gold, palladium, lead dioxide, and copper to mention a few. In one particularly suitable embodiment, the agitating members 137 are constructed of the same material as the horn 105, and are more suitably formed integrally with the horn. In other embodiments, one or more of the agitating members 137 may instead be formed separate from the horn 105 and connected thereto.

While the agitating members 137 (e.g., the rings) illustrated in FIG. 1 are relatively flat, i.e., relatively rectangular in cross-section, it is understood that the rings may have a cross-section that is other than rectangular without departing from the scope of this disclosure. The term "cross-section" is used in this instance to refer to a cross-section taken along one transverse direction (e.g., radially in the illustrated embodiment) relative to the horn outer surface 107). Additionally, although the agitating members 137 (e.g., the rings) illustrated in FIG. 1 are constructed only to have a transverse component, it is contemplated that one or more of the agitating members may have at least one longitudinal (e.g., axial) component to take advantage of transverse vibrational displacement of the horn (e.g., at and near the nodal region of the horn illustrated in FIG. 1) during ultrasonic vibration of the waveguide assembly 101.

As best illustrated in FIG. 1, the proximal end of the horn 105 is suitably spaced longitudinally from the inlet port 125 in FIG. 1 to define what is referred to herein as a liquid intake zone in which initial swirling of liquid within the interior space 153 of the chamber housing 151 occurs upstream of the horn 105. This intake zone is particularly useful where the treatment chamber 121 is used for mixing two or more components together whereby initial mixing is facilitated by the swirling action in the intake zone as the components to be mixed enter the chamber housing 151. Additionally, when removing compounds from the liquid, it may be desirable to use another ingredient (e.g., hydrogen peroxide) that can be premixed with the liquid being treated prior to the liquid coming into contact with the ultrasonic horn of the treatment chamber. More specifically, the additional ingredient, such as hydrogen peroxide, can be used as a strong oxidizing media to allow for better removal of the compounds from the liquid. It is understood, though, that the proximal end of the horn 105 may be nearer to the inlet port 125 than is illustrated in FIG. 1, and may be substantially adjacent to the inlet port so as to generally omit the intake zone, without departing from the scope of this disclosure.

Now referring to FIG. 2A, a baffle assembly, generally indicated at 245 is disposed within the interior space 253 of the chamber 221, and in particular generally transversely adjacent the inner surface 267 of the sidewall 257 and in generally transversely opposed relationship with the horn 205. In one suitable embodiment, the baffle assembly 245 comprises one or more baffle members 247 disposed adjacent the inner surface 267 of the housing sidewall 257 and extending at least in part transversely inward from the inner surface of the sidewall toward the horn 205. More suitably, the one or more baffle members 247 extend transversely inward from the housing sidewall inner surface 267 to a position longitudinally intersticed with the agitating members 237 that extend outward from the outer surface 207 of the horn 205. The term "longitudinally intersticed" is used herein to mean that a longitudinal line drawn parallel to the longitudinal axis of the horn 205 passes through both the agitating members 237 and the baffle members 247. As one example, in the illustrated embodiment the baffle assembly 245 comprises five, generally annular baffle members 247 (i.e., extending continuously about the horn 205) longitudinally intersticed with the six agitating members 237. Likewise, in FIGS. 4-6, when the waveguide assembly runs laterally within the housing, the one or more baffle members extend transversely inward from the housing sidewall inner surface to a position laterally intersticed with the agitating members that extend outward from the outer surface of the horn.

As a more particular example, the five annular baffle members 247 illustrated in FIG. 2A are of the same thickness as the agitating members 237 in our previous dimensional example (i.e., 0.125 inches (3.2 mm)) and are spaced longitudinally from each other (e.g., between opposed faces of consecutive baffle members) equal to the longitudinal spacing between the rings (i.e., 0.875 inches (22.2 mm)). Each of the annular baffle members 247 has a transverse length (e.g., inward of the inner surface 267 of the housing sidewall 257) of about 0.5 inches (12.7 mm) so that the innermost edges of the baffle members extend transversely inward beyond the outermost edges of the agitating members 237 (e.g., the rings). It is understood, however, that the baffle members 247 need not extend transversely inward beyond the outermost edges of the agitating members 237 of the horn 205 to remain within the scope of this disclosure.

It will be appreciated that the baffle members 247 thus extend into the flow path of liquid that flows within the interior space 253 of the chamber 221 past the horn 205 (e.g., within the ultrasonic treatment zone). As such, the baffle members 247 inhibit liquid against flowing along the inner surface 267 of the chamber sidewall 257 past the horn 205, and more suitably the baffle members facilitate the flow of liquid transversely inward toward the horn for flowing over the agitating members of the horn to thereby facilitate ultrasonic energization (i.e., agitation) of the liquid.

To inhibit gas bubbles against stagnating or otherwise building up along the inner surface 267 of the sidewall 257 and across the face on the underside of each baffle member 247, e.g., as a result of agitation of the liquid, a series of notches (broadly openings) are formed in the outer edge of each of the baffle members (not shown) to facilitate the flow of gas (e.g., gas bubbles) between the outer edges of the baffle members and the inner surface of the chamber sidewall. For example, in one particularly preferred embodiment, four such notches are formed in the outer edge of each of the baffle members in equally spaced relationship with each other. It is understood that openings may be formed in the baffle members other than at the outer edges where the baffle members abut the housing, and remain within the scope of this disclosure. It is also understood, that these notches may number more or less than four, as discussed above, and may even be completely omitted.

It is further contemplated that the baffle members 247 need not be annular or otherwise extend continuously about the horn 205. For example, the baffle members 247 may extend discontinuously about the horn 205, such as in the form of spokes, bumps, segments or other discrete structural formations that extend transversely inward from adjacent the inner surface 267 of the housing sidewall 257. The term "continuously" in reference to the baffle members 247 extending continuously about the horn does not exclude a baffle members as being two or more arcuate segments arranged in end-to-end abutting relationship, i.e., as long as no significant gap is formed between such segments. Suitable baffle member configurations are disclosed in U.S. application Ser. No. 11/530,311 (filed Sep. 8, 2006), which is hereby incorporated by reference to the extent it is consistent herewith.

Also, while the baffle members 247 illustrated in FIG. 2A are each generally flat, e.g., having a generally thin rectangular cross-section, it is contemplated that one or more of the baffle members may each be other than generally flat or rectangular in cross-section to further facilitate the flow of gas bubbles along the interior space 253 of the chamber 221. The term "cross-section" is used in this instance to refer to a cross-section taken along one transverse direction (e.g., radially in the illustrated embodiment, relative to the horn outer surface 207).

Referring back again to FIG. 1, the treatment chamber 121 is further connected to an electrical conducting generator, such as a DC current generator (indicated at 120), for creating an electrical potential within the interior space 153 of the chamber housing 151. It has been found that when mixing liquids such as in many electrochemical reactions, there is the disadvantage that arises from the fact that electrochemical reactions are heterogeneous and take place at the electrode-electrolyte interface in electrochemical reactors. Therefore, the performance of the electrochemical reactor often suffers from mass-transport limitations and the size of the specific electrode area. Specifically, one of the main factors that control the rate of a chemical reaction is the rate at which the reactants come together. During normal electrochemical reactions, there is little if any agitation supplied to the system and, as such, the diffusion rate of the reactants to the respective electrodes to facilitate a reaction is low. By electrically charging the treatment chamber of the present disclosure, these disadvantages can be overcome. Specifically, the application of the ultrasonic horn to also act as an electrode will supply the necessary agitation to the reaction mass. When the horn is operating in the cavitation mode, microcurrents that are generated, as discussed above, will minimize and, more desirably, eliminate the hydrodynamic boundary layer around the electrode-like horn. Furthermore, the microcurrents will supply motion to the chemical reactants and the reaction products, which can significantly enhance the overall chemical reactions that occur at the electrode.

As illustrated in FIG. 1, the generator 120 can be connected to the chamber 121 through electrical wires (indicated at 122 and 124) to one or more components of the treatment chamber 121. Specifically, in the illustrated embodiment, electrical wires 122 and 124 electrically connect the DC current generator 120 to the terminal end of the horn 105 (e.g., the terminal end 113 of the waveguide assembly 101) and the sidewall 157 of the chamber housing 151, respectively. Depending upon the materials used to form each of the sidewall of the chamber housing and the horn of the waveguide assembly, the electrical current produced creates an electrode potential such that the sidewall of the chamber housing shows properties typical of an anode and the horn shows the properties of a cathode, or vice versa.

Typically, the electrode potential produced by the generator 120 of the present disclosure is in the range of from about 0.1V to about 15V. More suitably, the electrode potential is in the range of from about 0.5V to about 5.0V and, even more suitably, from about 1.0V to about 3.0V. Furthermore, typical current density produced by the electrode potential within the treatment chamber ranges from about 0.1 kA/m$^2$ to about 2 kA/m$^2$ and, more suitably, the current density can be from about 1 kA/m$^2$ to about 1.5 kA/m$^2$.

More specifically, the electrode potential will be determined and produced in an amount required for the desired purpose of treatment chamber. For example, where the treatment chamber is desired for use in removing or electrolyzing a component from a liquid solution, the electrode potential produced will be that which is necessary to electrolyze that particular component from the solution. For example, when the treatment chamber is designed for use in the electrolysis of ammonia from a waste aqueous effluent, the electrode potential produced will be that required to electrolyze ammonia to produce nitrogen and hydrogen; that is, the electrode potential will be about 0.77V. Likewise, when the chamber is designed for use in the removal of chlorine from an aqueous potassium chloride solution, the electrode potential produced will be about 0.82V. By way of further example, the electrolysis of water to produce hydrogen and oxygen requires an electrode potential of about 2.06V. It should be understood by one skilled in the art that the examples described above should not be limiting as the electrode potential can be controlled over various ranges and for other additional uses, such as the mixing of liquid solutions and additional chemical reactions described herein above, without departing from the scope of this disclosure.

Moreover, it should be understood by one skilled in the art, that while the generator 120 is connected to the sidewall 157 and the terminal end 119 of the horn 105 in FIG. 1, the generator can be connected to numerous other areas of the treatment chamber 21 without departing from the scope of this disclosure. Specifically, as illustrated in FIGS. 2A and 3-6 and described more fully below, the electrical wires can connect the generator to multiple waveguide assemblies, each being fully disposed within the interior of the chamber housing of a single treatment chamber. More particularly, as illustrated in FIGS. 2A and 3-6, there are two waveguide assemblies, each having their own corresponding horns, in which the electrical wires connect the generator to each horn, thereby creating a cathode-like first horn and an anode-like second horn. It should be understood that the electrode potential could alternatively electrically charge the first horn as an anode and the second horn as a cathode without departing from the scope of this disclosure.

Referring again to FIG. 1, as there is an electrode potential produced within the interior 153 of the chamber housing 151 by connecting the sidewall 157 of the housing 151 and the outer surface 107 of the horn 105 to a generator 120, it is desirable for the housing 151 to be electrically insulated from the waveguide assembly 101 to maintain the electrode-like effect. As such, in the illustrated embodiment, the housing sidewall 157 is separated from the waveguide assembly 101 (and thus, the horn 105) by at least two insulating members 10 and 12.

Typically, the insulating members 10, 12 can be made using any insulating material known in the art. For example, the insulating members 10, 12 may be produced using any one of a multitude of known inorganic or organic insulating materials. Particularly suitable materials that could be used for the insulating members 10, 12 include solid materials with a high dielectric strength, such as for example, glass, mylar, kapton, ceramic, phenolic glass/epoxy laminates, and the like.

As further noted above, in some embodiments, the treatment chamber can include more than one waveguide assembly having at least two horn assemblies for ultrasonically treating and electrolyzing liquid solutions. Referring to FIG. 2A, the treatment chamber 221 comprises a housing 251 defining an interior space 253 of the chamber 221 through which liquid is delivered from two laterally opposing inlet ends 269 and 279. The housing 251 comprises an elongate tube 255 defining, at least in part, a sidewall 257 of the chamber 221. The tube 255 has two inlet ports 240 and 245 formed therein and being laterally opposed to one another through which one or more liquid solutions or components to be treated within the chamber 221 are delivered to the interior space 253 thereof, and at least one outlet port 265 through which the liquid, once treated, exits the chamber 221.

Two waveguide assemblies 201 and 203 extend longitudinally at least in part within the interior space 253 of the chamber 221 to ultrasonically energize liquid flowing through the interior space 253 of the chamber 221. Each waveguide assembly 201 and 203 separately includes an elongate horn assembly, generally indicated at 233 and 235, respectively, each disposed entirely within the interior space 253 of the housing 251 intermediate the inlet ports 269 and 279 and the outlet port 265 for complete submersion within the liquid being treated within the chamber 221. Each horn assembly 233 and 235 can be independently constructed as described (including the horns 205 and 209, along with the plurality of agitating members 237 and 239 and baffle assemblies 245 and 249) for the single horn assembly configuration of FIG. 1 above.

Figure 2B:
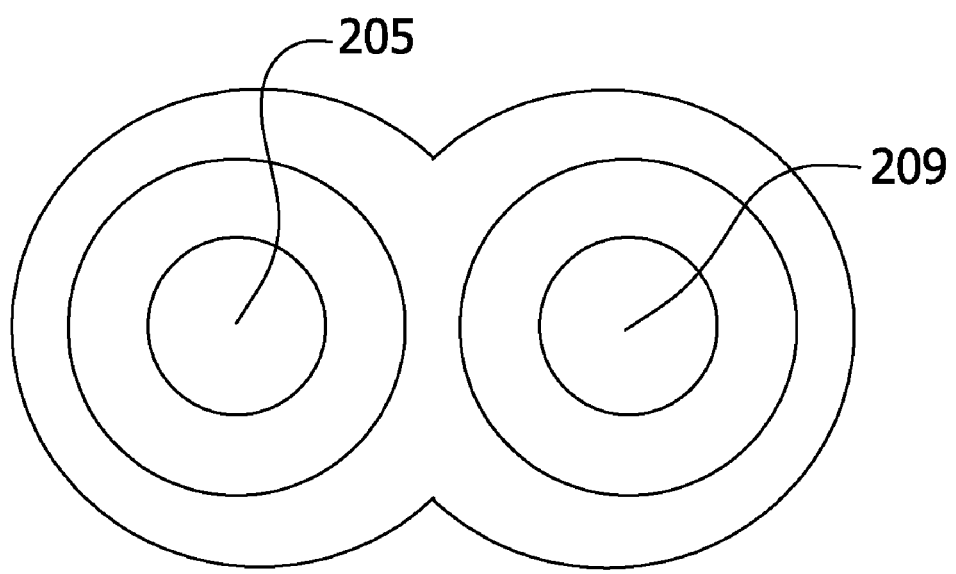
FIG. 2B is a top plan view of the treatment chamber of FIG. 2.

Still referring to FIG. 2A, a generator (not shown) can be electrically connected to the outside surfaces 207 and 211 of horns 205 and 209, respectively, of the two horn assemblies 233 and 235 to create an electrode potential within the interior 253 of the housing 251 of the chamber 221. As illustrated in FIG. 2A, the outer surface 211 of the second horn 209 is electrically charged to behave as an anode, while the outer surface 207 of the first horn 205 is electrically charged to behave as a cathode (see also FIG. 2B, illustrating the terminal end of the first horn 205 as a cathode and the terminal end of the second horn 209 as an anode). It should be understood that the first horn 205 could alternatively act as the anode and the second horn 209 could act as the cathode without departing from the scope of this disclosure. Furthermore, as with the treatment chamber of FIG. 1, the housing 251 is separated from the first waveguide assembly 201 using at least a first insulating member 210 and at least a second insulating member 212 and from the second waveguide assembly 203 using at least a third insulating member 214 and at least a fourth insulating member 216.

Figure 3:
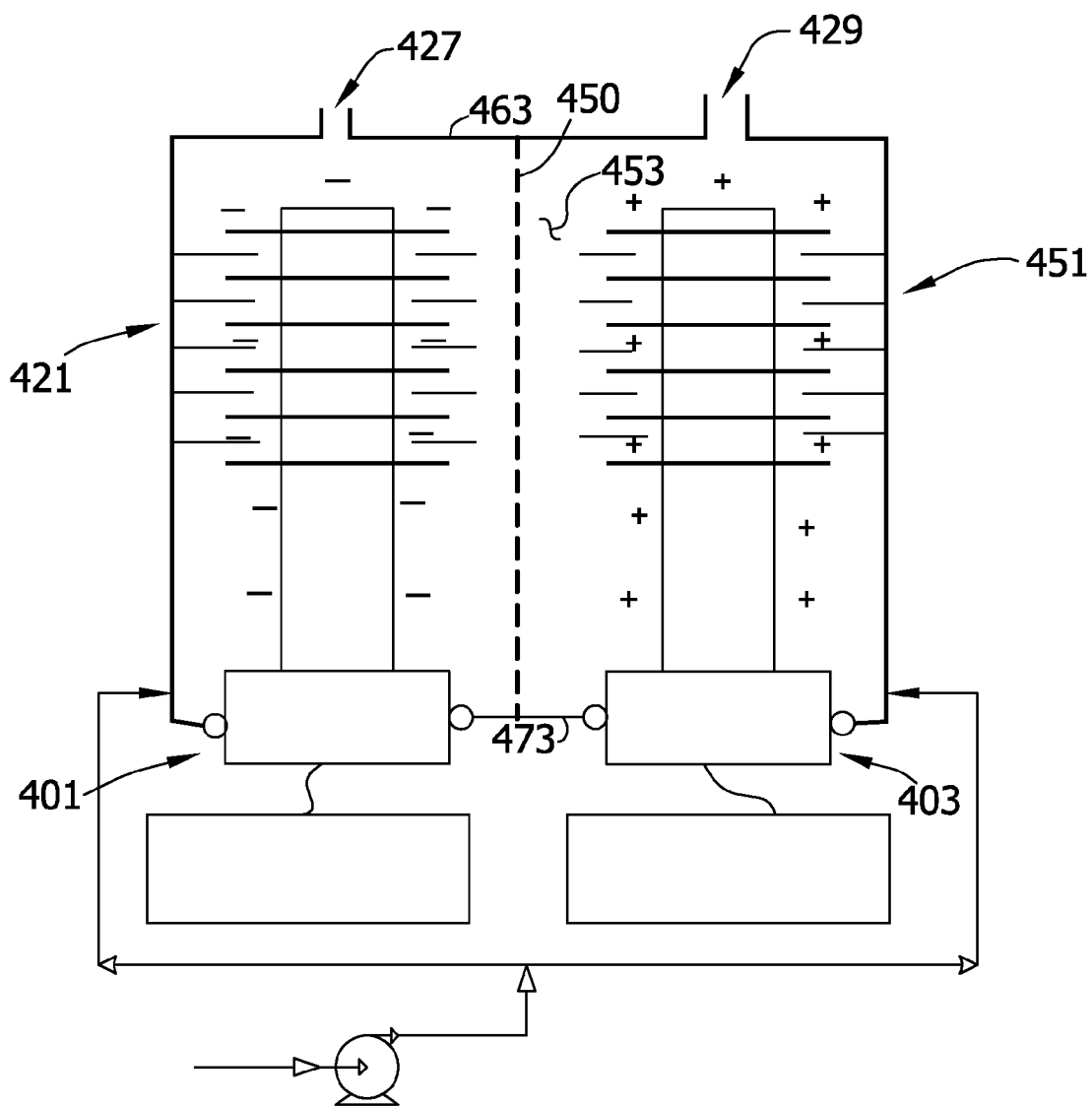
FIG. 3 a schematic of a treatment chamber according to a third embodiment of the present disclosure for ultrasonically treating and electrolyzing a liquid.

Now referring to FIG. 3, the treatment chamber 421 is similar to the treatment chamber 221 of FIG. 2A in that the chamber 421 contains two separate waveguide assemblies 401 and 403. The waveguide assemblies 401, 403 of FIG. 3, however, are further separated within the interior space 453 of the housing 451 by a mesh substrate 450 that runs laterally between the first waveguide assembly 401 and the second waveguide assembly 403. More particularly, the mesh substrate 450 extends from the upper longitudinal end (e.g., first longitudinal end) of the housing, generally indicated at 463 (e.g., corresponding to closure 263 of FIG. 2A) to the lower longitudinal end (e.g., second longitudinal end) of the housing, generally indicated at 473. The mesh substrate is generally capable of separating gases being generated as compounds are electrolyzed from the liquid. For example, in the electrolysis of ammonia, nitrogen gas is formed at the anode and hydrogen gas is formed at the cathode. It is desirable to keep these gases separate for later resale purposes.

Furthermore, the mesh substrate can be used to allow formed ions to migrate across the treatment chamber from the anode to the cathode so as to keep ionic neutrality in the entire liquid. For example, the electrolysis of water forms hydrogen gas and oxygen gas. At the anode, oxygen gas is formed along with the hydrogen ion ($H^+$) and, at the cathode, hydrogen gas is formed along with the hydroxyl ion ($OH^-$). Both the hydrogen and hydroxyl ions can migrate across this mesh substrate so as to maintain ionic neutrality within the interior of the treatment chamber.

Typically, the mesh substrate can be made of any suitable material known in the art. For example, one particular material for the mesh substrate is stainless steel. Further examples include, mesh substrates made from polyethylene, polypropylene, and perfluorinated materials. Suitably, the mesh substrate has a pore size of from about 15 microns to about 450 microns and, more suitably, from about 20 microns to about 100 microns. The mesh substrate typically has a thickness of from about 0.001 inches to a bout 0.05 inches and, more suitably, from about 0.005 inches to about 0.04 inches.

As the treatment chamber 421 is divided into two compartments by the mesh substrate 450, it is suitable for the housing 451 to include more than one outlet port. Specifically, in the illustrated embodiment, there are two outlet ports 427 and 429. More specifically, the first outlet port 427 allows liquid that has been treated by the first waveguide assembly 401 to exit the interior space 453 of the chamber housing 451, and the second outlet port 429 allows liquid that has been treated by the second waveguide assembly 403 to exit the interior space 453 of the chamber housing 451. It should be understood by one skilled in the art that, while FIG. 3 depicts two outlet ports, the housing 451 of the treatment chamber 421 may include more than two outlet ports, or alternatively only one outlet port, without departing from the scope of this disclosure.

Referring now to FIG. 4, the treatment chamber 521 is generally elongate, however, in contrast to FIGS. 1-3, the treatment chamber 521 is configured such that fluid enters the chamber 521 at the inlet end 535 thereof, flows generally laterally within the chamber (e.g., toward the right in the orientation of illustrated embodiment) and exits the chamber 521 generally at the outlet end 527 of the chamber 521. The treatment chamber 521 comprises a housing 551 defining an interior space 553 of the chamber 521 through which liquid is delivered from at least one inlet port 569. The housing 551 comprises an elongate tube 555 defining, at least in part, a sidewall 557 of the chamber 521. The housing 551 has two longitudinally opposing ends through which one or more liquid solutions or components to be treated within the chamber 521 are delivered to the interior space 553 thereof (through one or more inlet ports), and at least one outlet port 565 through which the liquid, once treated, exits the chamber 521.

Two waveguide assemblies 501 and 503 extend laterally at least in part within the interior space 553 of the chamber 521 to ultrasonically energize liquid flowing through the interior space 553 of the chamber 521. Each waveguide assembly 501 and 503 separately includes an elongate horn assembly, generally indicated at 533 and 535, respectively, each disposed entirely within the interior space 553 of the housing 551 intermediate the inlet port 569 and the outlet port 565 for complete submersion within the liquid being treated within the chamber 521. In the illustrated embodiment, the terminal ends 573 and 575 of horn assemblies 533 and 535, respectively, directly face each other. Each horn assembly 533 and 535 can be independently constructed as described (including the horns 505 and 509, along with the plurality of agitating members 537 and 539 and baffle assemblies (not shown)) for the single horn assembly configuration of FIG. 1 above.

Still referring to FIG. 4, an electric DC current generator (not shown) can be electrically connected to the outside surfaces 507 and 511 of horns 505 and 509, respectively, of the two horn assemblies 533 and 535 to create an electrode potential within the interior space 553 of the housing 551 of the chamber 521. As illustrated in FIG. 4, the outer surface 511 of the second horn 509 is electrically charged as an anode, while the outer surface 507 of the first horn 505 is electrically charged as a cathode. It should be understood that the first horn 505 could be alternatively electrically charged as the anode and the second horn 509 could be charged as the cathode without departing from the scope of this disclosure. Furthermore, as with the treatment chamber of FIGS. 1 and 2A, the housing 551 is separated from the first waveguide assembly 501 using at least a first insulating member 510 and at least a second insulating member 512 and from the second waveguide assembly 503 using at least a third insulating member 514 and at least a fourth insulating member 516.

As illustrated in FIG. 5, in some embodiments in which two or more waveguide assemblies 601 and 603 extend laterally at least in part within the interior space 653 of the chamber 621 to ultrasonically energize liquid flowing through the interior space 653 of the chamber 621, the terminal ends 673 and 675 of horn assemblies 633 and 635, respectively, face away from each other.

In the illustrated embodiment, the waveguide assemblies 633 and 635 are separated within the interior space 653 of the housing 651 by a mesh substrate 650, similar to the mesh substrate of FIG. 3, that runs laterally between the first waveguide assembly 601 and the second waveguide assembly 603. More particularly, the mesh substrate 650 extends from the upper longitudinal end (e.g., first longitudinal end) of the housing, generally indicated at 663 (e.g., corresponding to closure 263 of FIG. 2A) to the lower longitudinal end (e.g., 2nd longitudinal end) of the housing, generally indicated at 678. In the illustrated embodiment, the mesh substrate 650 provides structural support to the first waveguide assembly 601 and second waveguide assembly 603, and more particularly, is constructed to substantially vibrationally isolate the first waveguide assembly 601 and second waveguide assembly 603 within the interior space 653 from the chamber housing 651.

Like the waveguide assembly of FIG. 1 described above, the first waveguide assembly 601 and the second waveguide assembly 603 can suitably be mounted on the mesh substrate 650 by a mounting member (not shown). The mounting member used as described above for the illustrated embodiment of FIG. 1 can be used as the mounting member in this embodiment.

As the treatment chamber 621 is divided into two compartments by the mesh substrate 650, it is suitable for the housing 651 to include more than one inlet port (as illustrated, the housing includes a first inlet port, generally indicated at 669, and a second inlet port, generally indicated at 679) and more than one outlet port (as illustrated, the housing includes a first outlet port, generally indicated at 627, and a second outlet port, generally indicated at 629). More specifically, the first inlet port 669 allows one or more liquid solutions to enter into the interior space 653 of the chamber housing 651 to be ultrasonically treated and electrolyzed by the first waveguide assembly 601 and then the first outlet port 627 allows liquid that has been treated by the first waveguide assembly 601 to exit the interior space 653 of the chamber housing 651, and the second inlet port 679 allows one or more liquid solutions to enter into the interior space 653 of the chamber housing 651 to be ultrasonically treated and electrolyzed by the second waveguide assembly 603 and then the second outlet port 629 allows liquid that has been treated by the second waveguide assembly 603 to exit the interior space 653 of the chamber housing 651.

In yet another alternate configuration, as illustrated in FIG. 6, the treatment chamber 721 is generally elongate and configured such that fluid enters the chamber 721 at the inlet end 759 thereof, flows generally laterally within the chamber (e.g., toward the left in the orientation of illustrated embodiment) and exits the chamber 721 generally at the outlet end 727 of the chamber 721. The treatment chamber 721 comprises a housing 751 defining an interior space 753 of the chamber 721 through which liquid is delivered from at least one inlet port 769. The housing 751 comprises an elongate tube 755 defining, at least in part, a sidewall 757 of the chamber 721. The housing 751 has two longitudinally opposing ends through which one or more liquid solutions or components to be treated within the chamber 721 are delivered to the interior space 753 thereof, and at least one outlet port 765 through which the liquid, once treated, exits the chamber 721.

Two waveguide assemblies 701 and 703 extend laterally at least in part within the interior space 753 of the chamber 721 to ultrasonically energize liquid flowing through the interior space 753 of the chamber 721. Each waveguide assembly 701 and 703 separately includes an elongate horn assembly, generally indicated at 733 and 735, respectively, each disposed entirely within the interior space 753 of the housing 751 intermediate the inlet port 769 and the outlet port 765 for complete submersion within the liquid being treated within the chamber 721. In the illustrated embodiment, the second horn, indicated generally at 709, of second horn assembly 735 of the second waveguide assembly 703 is configured in a hollow cylinder shape. The first horn member, indicated at 715, of the first horn assembly 733 of the first waveguide assembly 701 is disposed lengthwise within the hollow cylinder shaped second horn 709.

In an alternative embodiment (not shown), the second horn can be configured in a U-shape and can include two arm members. The first horn member is disposed between the first arm member and the second arm member of the second horn. When the first horn and the second horn members each comprise agitating members as described above, this configuration can allow for better overlap of the agitating members, producing increased cavitation.

In either of the above two embodiments, each horn assembly 733 and 735 can further separately include the plurality of agitating members 737 and 739, respectively, and baffle assemblies (not shown) as with the single horn assembly configuration of FIG. 1 above.

Figure 8:
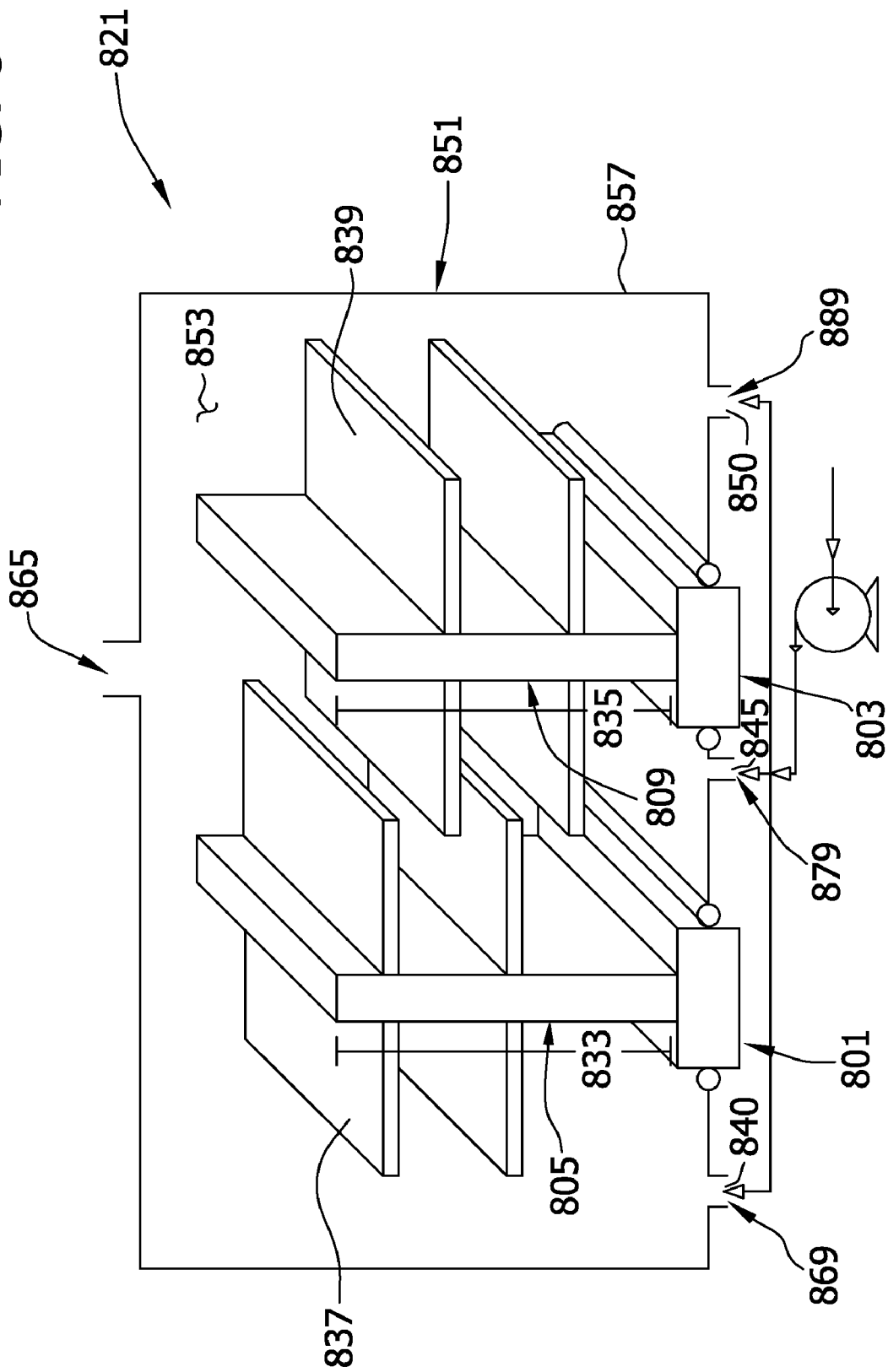
FIG. 8 is a schematic of a treatment chamber according to an eighth embodiment of the present disclosure for ultrasonically treating and electrolyzing a liquid.

Now referring to FIG. 8, the treatment chamber 821 comprises a housing 851 defining an interior space 853 of the chamber 821 through which liquid is delivered from three laterally aligned inlet ends 869, 879 and 889. The housing 851 comprises an elongate tube defining, at least in part, a sidewall 857 of the chamber 821. The tube has three inlet ports 840, 845 and 850 formed therein and being laterally aligned to one another through which one or more liquid solutions or components to be treated within the chamber 821 are delivered to the interior space 853 thereof, and at least one outlet port 865 through which the liquid, once treated, exits the chamber 821.

Two waveguide assemblies 801 and 803 extend longitudinally at least in part within the interior space 853 of the chamber 821 to ultrasonically energize liquid flowing through the interior space 853 of the chamber 821. Each waveguide assembly 801 and 803 separately includes a plate-like elongate horn assembly, generally indicated at 833 and 835, respectively, each disposed entirely within the interior space 853 of the housing 851 intermediate the inlet ports 869, 879 and 889 and the outlet port 865 for complete submersion within the liquid being treated within the chamber 821. Each horn assembly 833 and 835 can be independently constructed as described (including the horns 805 and 809, along with the plurality of agitating members 837 and 839 and baffle assemblies (not shown)) for the single horn assembly configuration of FIG. 1 above. In this configuration, the agitating members 837 and 839, when present, are flat disk-like pieces that surround the outer surface of the plate-like horn members.

Furthermore, in the treatment chamber illustrated in FIG. 8, a generator (not shown) can be electrically connected to the outside surfaces of horns 805 and 809 as discussed of the treatment chamber in FIG. 2A above.

In operation according to one embodiment of the treatment chamber of the present disclosure, the treatment chamber is used to remove nitrogen and hydrogen ions (i.e., ammonia) from an aqueous ammonia solution. Specifically, the aqueous ammonia solution is delivered (e.g., by the pumps described above) via conduits to one or more inlet ports formed in the treatment chamber housing. As these components enter the interior space of the chamber via the inlet port, the orientation of the inlet ports can induce a relatively swirling action. Furthermore, an air sparge can be in fluid communication with the treatment chamber to force air into the interior space of the chamber to further initiate a swirling action.

In accordance with the above embodiment of treating the aqueous ammonia solution, as the solution continues to flow upward within the chamber the waveguide assembly, and more particularly the horn assembly, is driven by the drive system to vibrate at a predetermined ultrasonic frequency. In response to ultrasonic excitation of the horn, the agitating members that extend outward from the outer surface of the horn dynamically flex/bend relative to the horn, or displace transversely (depending on the longitudinal position of the agitating member relative to the nodal region of the horn).

The aqueous ammonia solution continuously flows longitudinally along the flow path between the horn assembly and the inner surface of the housing sidewall so that the ultrasonic vibration and the dynamic motion of the agitating members causes cavitation in the solution to further facilitate agitation.

The baffle members disrupt the longitudinal flow of liquid along the inner surface of the housing sidewall and repeatedly direct the flow transversely inward to flow over the vibrating agitating members.

Furthermore, the sidewall of the housing is electrically charged as an anode and the ultrasonic horn as a cathode. As such, as the aqueous ammonia solution is pushed through the interior space of the chamber housing, the negatively charged horn attracts the ammonium ions in the solution as the positively charged interior sidewall of the housing repels the ammonium ions, further separating the ammonia present in the aqueous ammonia solution. Furthermore, due to the cavitation produced, the dissolved ammonia is pulled into the vapor phase by the negative pressure in the cavitating microbubbles. As noted above, an air sparge can be used in the treatment chamber. As air is pumped with the air sparge into the solution within the chamber, gaseous ammonia is transferred to the microbubbles before the cavitation microbubbles collapse. The exiting air will then diminish the concentration of dissolved ammonia in the aqueous solution.

In an alternative method, the ammonia in the aqueous ammonia solution is electrolyzed to form nitrogen gas and hydrogen gas. Specifically, nitrogen gas is formed at the anode-charged sidewall of the housing and hydrogen gas is formed at the cathode-charged outer surface of the ultrasonic horn.

The treatment chamber may also optionally be combined with a post-processing system in fluid communication with the outlet end of the treatment chamber for processing the aqueous solution, having a lower concentration of nitrogen after the solution exits the chamber. For example, the illustrated treatment chamber may be combined with one or more pressure gauges to monitor the liquid pressure in the chamber. One or more filter units may also be disposed along the flow path of the aqueous solution downstream of the treatment chamber to filter out particulate material, such as dirt, debris or other contaminates that may be present in the solution (e.g., initially being present in the original aqueous ammonia solution delivered to the chamber). For example, in the one embodiment a first filter unit may be constructed to filter out particles sized greater than about 0.5 microns and a second filter unit downstream from the first filter unit is constructed to further filter out particles sized greater than about 0.2 microns. It is understood, however, that only one, or more than two filter units may be used, or that the filter units may be omitted altogether, without departing from the scope of this disclosure.

The post-processing system may further comprise a degassing and bubble removal unit that is operable to remove gas bubbles from the liquid solution (e.g., the aqueous solution having a reduced concentration of nitrogen) after the ultrasonic treatment and electrolysis in the treatment chamber. In one particularly suitable embodiment the degassing and bubble removal unit comprises a conventional membrane contactor. The construction and operation of membrane contactors is well known to those skilled in the art and is therefore not described in further detail herein. One example of a suitable membrane contactor is that available from Membrana of Charlotte, N.C., U.S.A. under the trade name SuperPhobic. One or more sensor units may also be provided to monitor various characteristics of the aqueous solution such as, without limitation, pH, conductivity, viscosity, temperature, color, surface tension and other characteristics.

In one embodiment, such as when hydrogen peroxide is introduced into the treatment chamber to be used as an oxidizing media for removing compounds from an aqueous solution, the residual hydrogen peroxide may need to be removed from the exit stream by a post processing unit that reacts with the hydrogen peroxide. For example, this post processing unit may include a platinum or silver surface that decomposes the residual hydrogen peroxide. Similarly, when ozone is introduced to aid in the removal of compounds, a post processing unit, such as a destruct unit, may be used to decompose the ozone exiting the treatment chamber.

Following post-processing, the solution treated by the treatment chamber may be directed to a storage container or operating device having any of a number of applications. Any system used to deliver the treated liquid to an applicator may be disposed downstream of the post-processing system, or the post-processing system may be omitted and a system may communicate directly with the outlet port of the chamber to deliver the treated liquid to a subsequent applicator.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A treatment chamber for treating a liquid, the treatment chamber comprising:

an elongate housing having longitudinally opposite ends and an interior space, the housing being generally closed at least one longitudinal end and having at least one inlet port for receiving liquid into the interior space of the housing and at least one outlet port through which liquid is exhausted from the housing following ultrasonic treatment of the liquid, the outlet port being spaced longitudinally from the inlet port such that liquid flows longitudinally within the interior space of the housing from the inlet port to the outlet port;

an elongate ultrasonic waveguide assembly extending longitudinally within the interior space of the housing and being operable at a predetermined ultrasonic frequency to ultrasonically energize liquid flowing within the housing, the waveguide assembly comprising an elongate ultrasonic horn disposed at least in part intermediate the inlet port and the outlet port of the housing and having an outer surface located for contact with liquid flowing within the housing from the inlet port to the outlet port, and a plurality of discrete agitating members in contact with and extending transversely outward from the outer surface of the horn intermediate the inlet port and the outlet port in longitudinally spaced relationship with each other, the agitating members and the horn being constructed and arranged for dynamic motion of the agitating members relative to the horn upon ultrasonic vibration of the horn at the predetermined frequency and to operate in an ultrasonic cavitation mode of the agitating members corresponding to the predetermined frequency and the liquid being treated in the chamber;

an electrical current source being in electrical contact with the outer surface of the horn and a sidewall of the housing, thereby producing an electrode potential within the interior space of the housing, wherein the electrode potential produced is in the range of about 0.1V to about 15V; and at least a first insulating member and a second insulating member electrically insulating the housing from the waveguide assembly.

2. The treatment chamber as set forth in claim 1 wherein the electrode potential electrically charges the horn as a cathode and the sidewall of the housing as an anode.

3. The treatment chamber as set forth in claim 1 wherein the electrode potential electrically charges the horn as an anode and the sidewall of the housing as a cathode.

4. The treatment chamber as set forth in claim 1 in combination with an air sparge for forcing air into the interior space of the housing.

5. A treatment chamber for treating a liquid, the treatment chamber comprising:
an elongate housing having longitudinally opposite ends and an interior space, the housing being generally closed at least one longitudinal end and having a first inlet port and a second inlet port for receiving liquid into the interior space of the housing and at least one outlet port through which liquid is exhausted from the housing following ultrasonic treatment of the liquid, the outlet port being spaced longitudinally from the first inlet port and the second inlet port such that liquid flows longitudinally within the interior space of the housing from the first inlet port and the second inlet port to the outlet port;
a first elongate ultrasonic waveguide assembly extending longitudinally within the interior space of the housing and being operable at a first predetermined ultrasonic frequency to ultrasonically energize liquid flowing within the housing, the first waveguide assembly comprising a first elongate ultrasonic horn disposed at least in part intermediate the first inlet port and the outlet port of the housing and having an outer surface located for contact with liquid flowing within the housing from the first inlet port to the outlet port, and a plurality of discrete agitating members in contact with and extending transversely outward from the outer surface of the first horn intermediate the first inlet port and the outlet port in longitudinally spaced relationship with each other, the agitating members and the first horn being constructed and arranged for dynamic motion of the agitating members relative to the first horn upon ultrasonic vibration of the first horn at the first predetermined frequency and to operate in an ultrasonic cavitation mode of the agitating members corresponding to the first predetermined frequency and the liquid being treated in the chamber;
a second elongate ultrasonic waveguide assembly extending longitudinally within the interior space of the housing and being oriented in parallel to the first elongate ultrasonic waveguide assembly, the second waveguide assembly being operable at a second predetermined ultrasonic frequency to ultrasonically energize liquid flowing within the housing and comprising a second elongate ultrasonic horn disposed at least in part intermediate the second inlet port and the outlet port of the housing and having an outer surface located for contact with liquid flowing within the housing from the second inlet port to the outlet port, and a plurality of discrete agitating members in contact with and extending transversely outward from the outer surface of the second horn intermediate the second inlet port and the outlet port in longitudinally spaced relationship with each other, the agitating members and the second horn being constructed and arranged for dynamic motion of the agitating members relative to the second horn upon ultrasonic vibration of the second horn at the second predetermined frequency and to operate in an ultrasonic cavitation mode of the agitating members corresponding to the second predetermined frequency and the liquid being treated in the chamber;
an electrical current source being in electrical contact with the outer surface of the first horn and the outer surface of the second horn, thereby producing an electrode potential within the interior space of the housing, wherein the electrode potential produced is in the range of about 0.1V to about 15V; and
at least a first insulating member and a second insulating member electrically insulating the housing from the first waveguide assembly and at least a third insulating member and a fourth insulating member electrically insulating the housing from the second waveguide assembly.

6. The treatment chamber as set forth in claim 5 wherein the outlet port is a first outlet port, the treatment chamber further comprising a second outlet port.

7. The treatment chamber as set forth in claim 6 wherein the housing comprises a first longitudinal end and a second longitudinal end and, wherein the treatment chamber further comprises a mesh substrate located laterally between the first waveguide assembly and the second waveguide assembly and extends from the first longitudinal end of the housing to the second longitudinal end of the housing.

8. The treatment chamber as set forth in claim 5 wherein the electrode potential electrically charges the first horn as a cathode and the second horn as an anode.

9. The treatment chamber as set forth in claim 5 wherein the electrode potential electrically charges the first horn to act as an anode and the second horn to act as a cathode.

10. The treatment chamber as set forth in claim 5 wherein the first horn and agitating members together define a first horn assembly of the first waveguide assembly, the first horn assembly being disposed entirely within the interior space of the housing, and wherein the second horn and agitating members together define a second horn assembly of the second waveguide assembly, the second horn assembly being disposed entirely within the interior space of the housing.

11. The treatment chamber as set forth in claim 5 wherein at least one of the agitating members of the first waveguide assembly comprises a T-shape and at least one of the agitating members of the second waveguide assembly comprises a T-shape.

12. A treatment chamber for treating a liquid, the treatment chamber comprising:
an elongate housing having longitudinally opposite ends and an interior space, the housing being generally closed at least one longitudinal end and having at least one inlet port for receiving liquid into the interior space of the housing and at least one outlet port through which liquid is exhausted from the housing following ultrasonic treatment of the liquid, the outlet port being spaced laterally from the inlet port such that liquid flows laterally within the interior space of the housing from the inlet port to the outlet port;
a first elongate ultrasonic waveguide assembly extending laterally within the interior space of the housing and being operable at a first predetermined ultrasonic frequency to ultrasonically energize liquid flowing within the housing, the first waveguide assembly comprising a first elongate ultrasonic horn disposed at least in part intermediate the inlet port and the first lateral end of the housing and having an outer surface located for contact with liquid flowing within the housing from the inlet port to the outlet port, and a plurality of discrete agitating members in contact with and extending transversely outward from the outer surface of the first horn intermediate the inlet port in laterally spaced relationship with each other, the agitating members and the first horn being constructed and arranged for dynamic motion of the agitating members relative to the first horn upon ultrasonic vibration of the first horn at the first predetermined frequency and to operate in an ultrasonic cavitation mode of the agitating members corresponding to the first predetermined frequency and the liquid being treated in the chamber;

a second elongate ultrasonic waveguide assembly extending laterally within the interior space of the housing and being oriented laterally to the first elongate ultrasonic waveguide assembly, the second waveguide assembly being operable at a second predetermined ultrasonic frequency to ultrasonically energize liquid flowing within the housing and comprising a second elongate ultrasonic horn disposed at least in part intermediate the outlet port and the second lateral end of the housing and having an outer surface located for contact with liquid flowing within the housing from the inlet port to the outlet port, and a plurality of discrete agitating members in contact with and extending transversely outward from the outer surface of the second horn intermediate the outlet port in laterally spaced relationship with each other, the agitating members and the second horn being constructed and arranged for dynamic motion of the agitating members relative to the second horn upon ultrasonic vibration of the second horn at the second predetermined frequency and to operate in an ultrasonic cavitation mode of the agitating members corresponding to the second predetermined frequency and the liquid being treated in the chamber;

an electrical current source being in electrical contact with the outer surface of the first horn and the outer surface of the second horn, thereby producing an electrode potential within the interior space of the housing, wherein the electrode potential produced is in the range of about 0.1V to about 15V.

13. The treatment chamber as set forth in claim 12 further comprising a first mounting member for mounting the first waveguide assembly on the housing generally at a first lateral edge thereof, the first mounting member being constructed to substantially vibrationally isolate the first waveguide assembly from the second waveguide assembly and the housing, and a second mounting member for mounting the second waveguide assembly on the housing generally at a second lateral edge thereof, the second mounting member being constructed to substantially vibrationally isolate the second waveguide assembly from the first waveguide assembly and the housing, wherein the first lateral edge and second lateral edge are opposing edges.

14. The treatment chamber as set forth in claim 13 further comprising at least a first insulating member and a second insulating member electrically insulating the housing from the first waveguide assembly and at least a third insulating member and a fourth insulating member electrically insulating the housing from the second waveguide assembly.

15. The treatment chamber as set forth in claim 12 wherein the inlet port is a first inlet port and the outlet port is a first outlet port, the treatment chamber further comprising a second inlet port and a second outlet port, the first waveguide assembly is disposed at least in part intermediate the first inlet port and the first outlet port of the housing and the second waveguide assembly is disposed at least in part intermediate the second inlet port and the second outlet port of the housing.

16. The treatment chamber as set forth in claim 15 further comprising a mesh substrate located transversely between the first waveguide assembly and the second waveguide assembly and extending from the first longitudinal end of the housing to the second longitudinal end of the housing.

17. A treatment chamber for treating a liquid, the treatment chamber comprising:

an elongate housing having longitudinally opposite ends and an interior space, the housing being generally closed at least one longitudinal end and having at least one inlet port for receiving liquid into the interior space of the housing and at least one outlet port through which liquid is exhausted from the housing following ultrasonic treatment of the liquid, the outlet port being spaced laterally from the inlet port such that liquid flows laterally within the interior space of the housing from the inlet port to the outlet port;

a first elongate ultrasonic waveguide assembly extending laterally within the interior space of the housing and being operable at a first predetermined ultrasonic frequency to ultrasonically energize liquid flowing within the housing, the first waveguide assembly comprising a first elongate ultrasonic horn disposed at least in part intermediate the inlet port and the outlet port of the housing and having an outer surface located for contact with liquid flowing within the housing from the inlet port to the outlet port, and a plurality of discrete agitating members in contact with and extending transversely outward from the outer surface of the first horn intermediate the inlet port and the outlet port in laterally spaced relationship with each other, the agitating members and the first horn being constructed and arranged for dynamic motion of the agitating members relative to the first horn upon ultrasonic vibration of the first horn at the first predetermined frequency and to operate in an ultrasonic cavitation mode of the agitating members corresponding to the first predetermined frequency and the liquid being treated in the chamber;

a second elongate ultrasonic waveguide assembly extending laterally within the interior space of the housing, the second waveguide assembly being operable at a second predetermined ultrasonic frequency to ultrasonically energize liquid flowing within the housing and comprising a second elongate ultrasonic horn disposed at least in part intermediate the inlet port and the outlet port of the housing and having an outer surface located for contact with liquid flowing within the housing from the inlet port to the outlet port; the second ultrasonic horn being configured in a hollow cylinder shape, wherein the first ultrasonic horn of the first waveguide assembly is disposed lengthwise within the cylinder of the second ultrasonic horn; a plurality of discrete agitating members in contact with and extending transversely outward from the outer surface of the second horn intermediate the inlet port and the outlet port in laterally spaced relationship with each other, the agitating members and the second horn being constructed and arranged for dynamic motion of the agitating members relative to the second horn upon ultrasonic vibration of the second horn at the second predetermined frequency and to operate in an ultrasonic cavitation mode of the agitating members corresponding to the second predetermined frequency and the liquid being treated in the chamber;

an electrical current source being in electrical contact with the outer surface of the first horn and the outer surface of the second horn, thereby producing an electrode potential within the interior space of the housing, wherein the electrode potential produced is in the range of about 0.1V to about 15V.

* * * * *

Disclaimer

7,998,322 B2—Robert Allen Janssen et al., Alpharetta, GA (US). ULTRASONIC TREATMENT CHAMBER HAVING ELECTRODE PROPERTIES. Patent dated August 16, 2011. Disclaimer filed April 14, 2011, by the assignee, Kimberly-Clark Worldwide, Inc.

The term of this patent shall not extend beyond the expiration date of patent no. 7,998,322.

(*Official Gazette January 10, 2012*)

UNITED STATES PATENT AND TRADEMARK OFFICE
CERTIFICATE OF CORRECTION

| | | |
|---|---|---|
| PATENT NO. | : 7,998,322 B2 | Page 1 of 1 |
| APPLICATION NO. | : 11/777140 | |
| DATED | : August 16, 2011 | |
| INVENTOR(S) | : Robert Allen Janssen et al. | |

It is certified that error appears in the above-identified patent and that said Letters Patent is hereby corrected as shown below:

In the Claims

In Claim 1, Column 24, Lines 33-34, delete "closed at least" and insert -- closed at at least -- therefor.

In Claim 5, Column 25, Lines 16-17, delete "closed at least" and insert -- closed at at least -- therefor.

In Claim 12, Column 26, Lines 47-48, delete "closed at least" and insert -- closed at at least -- therefor.

Signed and Sealed this
Twelfth Day of May, 2015

Michelle K. Lee
*Director of the United States Patent and Trademark Office*